United States Patent
Kujiraoka et al.

(10) Patent No.: US 8,477,254 B2
(45) Date of Patent: Jul. 2, 2013

(54) BACKLIGHT MODULE WITH DETACHABLE LIGHT SOURCE UNIT AND LIQUID CRYSTAL DISPLAY DEVICE HAVING THE SAME

(75) Inventors: Hideki Kujiraoka, Kanagawa (JP); Kei Takahashi, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 916 days.

(21) Appl. No.: 12/379,351

(22) Filed: Feb. 19, 2009

(65) Prior Publication Data

US 2009/0268124 A1    Oct. 29, 2009

(30) Foreign Application Priority Data

Jun. 3, 2008 (JP) ................................. 2008-55836
Sep. 25, 2008 (JP) ................................. 2008-245318

(51) Int. Cl.
G02F 1/1333 (2006.01)
(52) U.S. Cl.
USPC .............. 349/58; 349/61; 349/62; 349/65; 349/56; 348/794
(58) Field of Classification Search
USPC .................... 349/60, 61, 62, 6, 58
See application file for complete search history.

(56) References Cited

U.S. PATENT DOCUMENTS

| | | | |
|---|---|---|---|
| 5,280,372 A | 1/1994 | Horiuchi | |
| 6,795,135 B1 * | 9/2004 | Moon | 349/61 |
| 6,979,095 B2 | 12/2005 | Min et al. | |
| 7,452,118 B2 | 11/2008 | Tsuchiya | |
| 2004/0130880 A1 | 7/2004 | Min et al. | |
| 2005/0088586 A1 * | 4/2005 | Mori et al. | 349/62 |
| 2006/0187376 A1 * | 8/2006 | Wang et al. | 349/62 |
| 2006/0238367 A1 | 10/2006 | Tsuchiya | |
| 2007/0126950 A1 * | 6/2007 | Kurihara | 349/65 |
| 2008/0030651 A1 * | 2/2008 | Shibata | 349/65 |
| 2008/0055517 A1 * | 3/2008 | Yu | 349/65 |

FOREIGN PATENT DOCUMENTS

| | | |
|---|---|---|
| JP | 6-51293 | 2/1994 |
| JP | 2004-213025 | 7/2004 |
| JP | 2005-321586 | 11/2005 |
| JP | 2006-302710 | 11/2006 |

* cited by examiner

*Primary Examiner* — Edward Glick
*Assistant Examiner* — Sang V Nguyen
(74) *Attorney, Agent, or Firm* — McGinn Intellectual Property Law Group, PLLC

(57) ABSTRACT

A backlight module with a detachable light source unit includes a light guide plate and a light source unit housed in a module case. The light source unit can slide along a lengthwise direction of one end face of the light guide plate. The light source unit is equipped with a U-shaped cover member for holding a plurality of point light sources such as LEDs along a lengthwise direction. The backlight module further includes a coupling member to change a positional relationship between the light guide plate and the light source unit such that a distance between an emitting surface of the LED and an incident plane of the light guide plate during a process of exchanging the light source unit is larger than that between the emitting surface and the incident plane at a time of home position of the light source unit in the module case.

13 Claims, 21 Drawing Sheets

BACKLIGHT MODULE WITH DETACHABLE LIGHT SOURCE UNIT AND LIQUID CRYSTAL DISPLAY DEVICE HAVING THE SAME

This application is based upon and claims the benefit of priority from Japanese patent application No. 2008-055836, filed on Mar. 6, 2008 and Japanese patent application No. 2008-245318, filed on Sep. 25, 2008, the disclosures of which are incorporated herein in its entirety by reference.

TECHNICAL FIELD

The present invention relates to a backlight module and a liquid crystal display (LCD) device with the backlight module and in particular, relates to the LCD device using an edge light type backlight module with a detachable light source unit having an array of point light sources such as light emitting diodes (LEDs).

BACKGROUND ART

One of the defect factors of the LCD device is either a non-lighting state of the light source or a brightness decline due to lifetime of the light source. Since these defects can be restored easily by replacing the light source, it is important to have an interchangeable mechanism or a detachable mechanism for a light source in the LCD device for a long-term use.

The above-mentioned detachable light source is described with reference to FIG. 27, which corresponds to FIG. 2 of the Japanese Patent Application Laid-Open No. 1994-051293 (patent document 1).

A detachable light source unit 271 disclosed in the patent document 1 is provided with light source holding parts 276 at both ends thereof and a reflective body 279 is extended between the holding parts to accommodate a light source 278 therein. This light source unit 271 is designed to sandwich a light guide plate (LGP) 275 with a light guide plate holding parts 270 and being held between a holding case 272 and slide system 277. The light source unit 271 is able to slide in parallel to the LGP 275 so that the light source unit 271 is enabled to be pulled out or ejected as a whole from the holding case 272 and thereby providing the detachable light source unit.

A straight pipe type cold cathode fluorescent tube is used as the above-mentioned light source which is operated with exothermic temperature higher than that of the LED (Light Emitting Diode). The straight type cold cathode fluorescent tube is a stick-like light source, and it emits light except for end portions adjacent to electrodes at both ends. When such the fluorescent tube is used as the light source, the reflective body 279 covers the fluorescent tube 278 except for the neighborhood of both ends around the light source. Only a part of the reflective body 279 opposing to an optical incident plane of the LGP 275 is opened to direct the light of the light source enter into the LGP 275. In order to avoid influence of heat from the light source, the reflective body 279 and the LGP 275 are generally separated from the light source. Accordingly, a distance between the light emitting surface of the light source and the optical incident plane of the LGP slightly affects its optical characteristic.

On the other hand, when an array of the LEDs is used as the light source, each of the LEDs is a point-like light source and thus requiring efficient usage of the output light. Therefore, the distance between the light emitting surface of the LED and the optical incident plane of the LGP greatly affects its optical characteristic. In order to take full advantage of the light of the point light source as the backlight module of the LCD device, it is necessary to enter the output light into the LGP without leaking the output light from the point light source. To this end, it is required to place the light emitting surface of the LED as close as possible to the optical incident plane of the LGP, and as shown in FIG. 28, which corresponds to FIG. 1 of the Japanese Patent Application Laid-Open No. 2005-321586 (patent document 2), the structure that makes an LED light source 28 touch onto an LGP 25 is general and effective. In FIG. 28, the LED light source 28 is mounted on a flexible printed circuits (FPC) substrate 29 and the FPC substrate 29 is fixed to the LGP by using a double-stick tape 259. The LGP 25 is sandwiched between a reflective sheet 26 and a group of optical sheets 24 and they are housed within a case 27 and covered by a pushing frame 22.

Since the array of LEDs 28 is the array of point-lights opposing to the optical incident plane 255 of the LGP 25, an array of bright spots due to the LEDs tends to occur at the light emitting surface of a backlight module or the liquid crystal display surface. In order to avoid such occurrence, special treatments are applied to the optical incident plane 255 of the LGP 25 or opposing surfaces of the LEDs 28 and the LGP 25 so as to eliminate dot-like bright spots due to LED emission by dispersing the output light of the LEDs 28, and thereby equalizing the brightness of the light emitting surface 251 or the LCD surface of the backlight module as shown in Japanese Patent Application Laid-Open No. 2006-302710 (patent document 3) and Japanese Patent Application Laid-Open No. 2004-213025 (patent document 4). FIG. 29 and FIG. 30 correspond to FIG. 3 and FIG. 1 of the patent document 3, respectively, and FIG. 31 corresponds to FIG. 6 of the patent document 4.

In FIG. 29 and FIG. 30, the array of the LEDs 28 is provided on the wiring substrate 29. A prismatic group 256 is formed on the optical incident plane of the LGP 25.

In FIG. 31, a refraction member 285 is interposed between the LEDs 28 and the LGP 25. The refraction member 285 is provided with light transmission areas 284 on the side surface thereof opposing to the optical incident plane 255 of the LGP 25 through which a central optical axis 289 of each of the LEDs 28 passes, and prismatic areas 286 are formed on both sides of each light transmission area 284. The hologram pattern 256 is provided on a rear side of the LGP 25.

When the cold cathode fluorescent tube is used as the light source, in view of considering influence of the heat of the light source and such structure that the light source is stick-type and the whole light source emits light while the light source is covered with the reflective body, it is effective to separate the light source and the LGP, and such light source interchangeable mechanism as shown in patent document 1 can be used.

However, when a point light source like the LED is used as a light source (hereinafter, referred to as LED), the light emitting surface of the LED needs to be brought as close as possible to the optical incident plane of the LGP as mentioned above. Accordingly, when a mechanism of a detachable light source shown in the patent document 1 is applied to the LED light source unit, the light source and the LGP are touched each other at a time of inserting or ejecting the light source unit, and causing such a problem that the light emitting surface of the LED, the optical incident plane of the LGP or a specially treated portion would be damaged and result in a display defect such as bright spots or dark spots.

When the gap of the LGP and the light source is made large to avoid the above mentioned problems, because the distance of the optical incident plane of the LGP and the light emitting surface of the LED greatly affects the optical characteristic, a problem is caused such that a utilization efficiency of the emitted light of the LED decreases remarkably.

SUMMARY

An exemplary object of the invention is to provide a backlight module and an LCD device which prevent a decline of a utilization efficiency of emitted light of the LED by preventing damages of a light emitting surface of the LED, an optical incident plane of the LGP or the specially treated portion, during an exchange process of the light source unit.

A backlight module according to an exemplary aspect of the present invention includes a light guide plate housed in a module case such that the light guide plate has an elongated edge portion for a light incident surface between a pair of principal surfaces thereof. A light source unit is incorporated in the module case interchangeably so as to slide along a lengthwise direction of the edge portion of the light guide plate. The light source unit is equipped with a cover member for holding a plurality of point light sources along the lengthwise direction. The cover member has a front side member and a rear side member arranged in parallel to the principal surfaces of the light guide plate, and which is united together with a side wall member. And further includes a coupling member enabling to change a positional relationship between the light guide plate and the light source unit. The coupling member has such a structure that a first distance between a light emitting surface of the point light source and the optical incident plane at a time of interchanging the light source unit is larger than a second distance between the light emitting surface of the point light source and the optical incident plane at a time of settled in a home position of the light source unit within the module case.

According to another exemplary aspect of the present invention, a liquid crystal display device using the above-mentioned backlight module is also obtained.

BRIEF DESCRIPTION OF THE DRAWINGS

Exemplary features and advantages of the present invention will become apparent from the following detailed description when taken with the accompanying drawings in which.

EXEMPLARY EMBODIMENT

As indicated in the background art, in order to perform the long-term usage of the LCD device, a light source interchangeable mechanism is needed. When a cold cathode fluorescent tube is used as the light source, since the light source and the LGP can be separated, they are rarely contacted each other during replacement process of the light source unit. On the other hand, when the LED is used as a light source, the light source and the LGP tend to touch each other at a time of inserting or ejecting the detachable light source. This is because the light source and the LGP have to be brought close so as not to lower a utilization efficiency of the emitted light of the LED.

Accordingly, in an exemplary embodiment of the present invention, a light emitting surface of the light source unit using the LED and an optical incident plane of the LGP are set closely each other at the time of fixed position of the light source, and it is designed to have a structure that a distance between the light emitting surface of the light source and the optical incident plane of the LGP is generated or increased at the time of either an inserting process of the light source unit, or a pulling-out process of the light source unit, i.e., an ejecting process. Hereinafter, the detachable light source unit will be described in detail with reference to drawings.

Exemplary Embodiment 1

Figure 1:
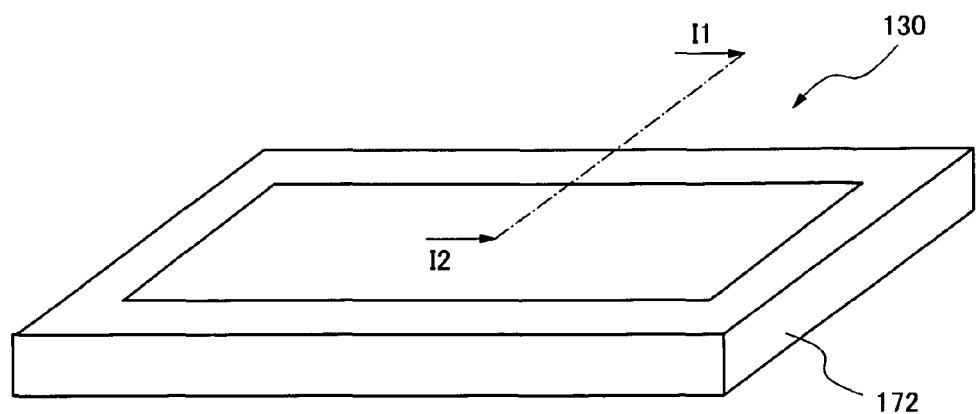
FIG. 1 is a perspective view showing the structure of the LCD device according to the first exemplary embodiment of the present invention.
Figure 2:
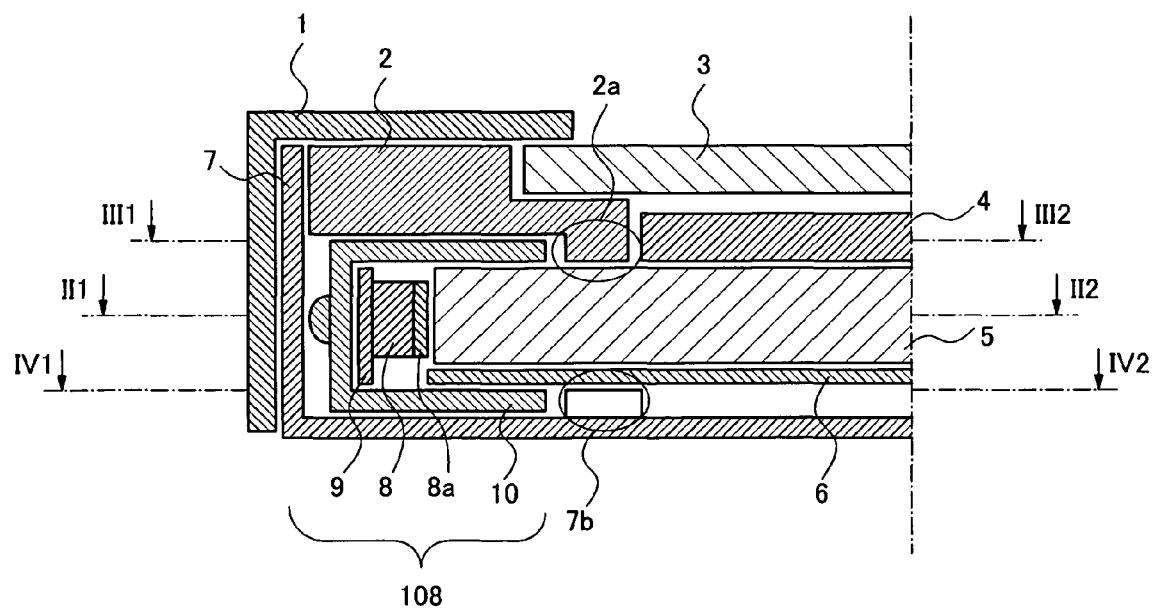
FIG. 2 is a cross sectional view along the I1-I2 line shown in FIG. 1.
Figure 3:
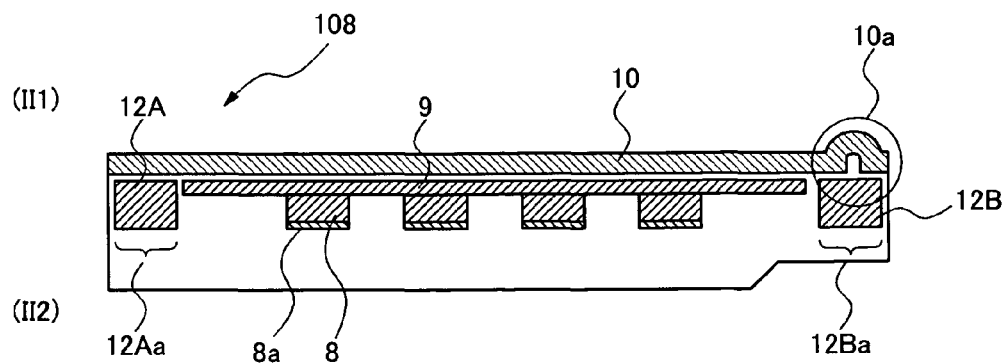
FIG. 3 is a cross sectional view along the II1-II2 line of the light source unit shown in FIG. 2.
Figure 4:
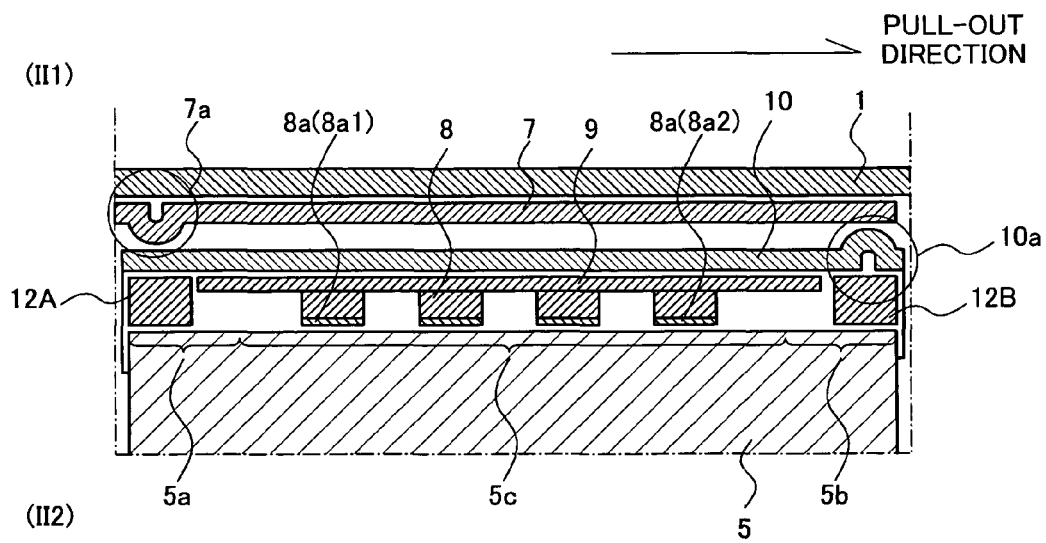
FIG. 4 is a cross sectional view along the II1-II2 line shown in FIG. 2 and showing a positional relationship between the LED and the LGP in the state that the light source unit is settled in a normal fixed position or home position.
Figure 5:
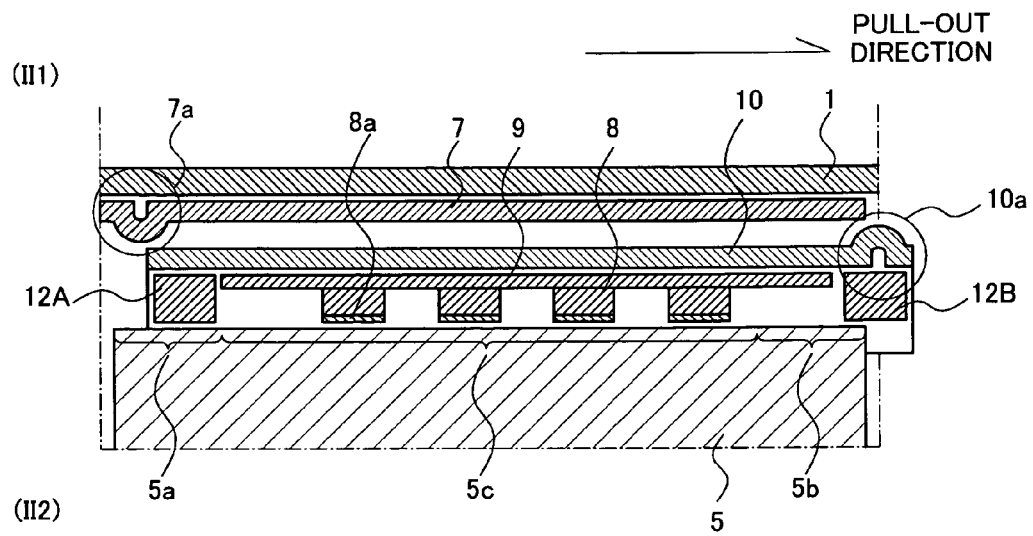
FIG. 5 is a cross sectional view along the II1-II2 line shown in FIG. 2 and showing a positional relationship between the LED and the LGP in a state that a light source unit is slightly pulled out from its home position.
Figure 6:
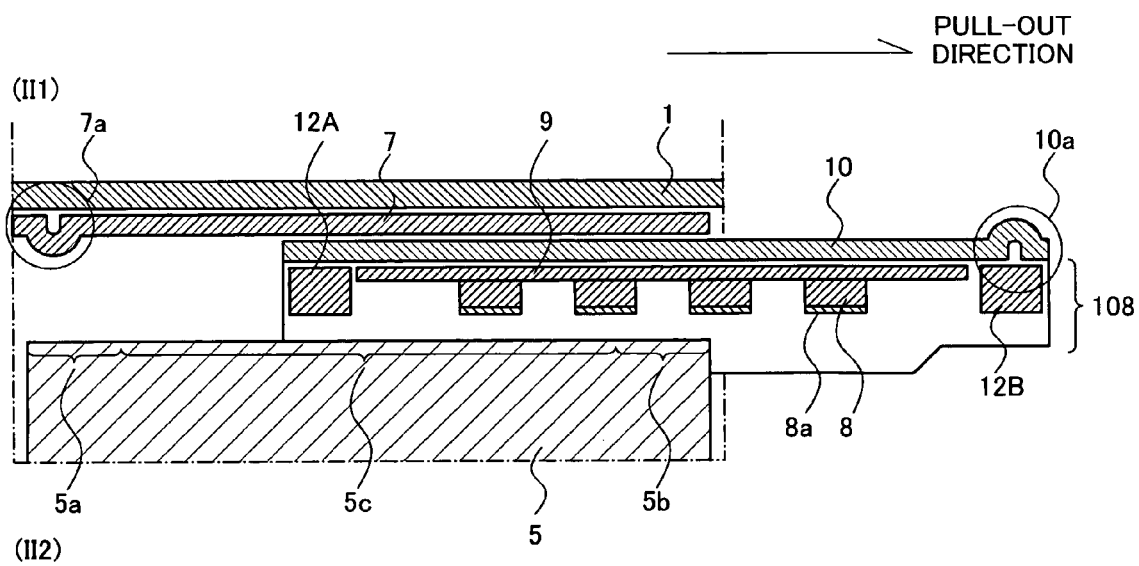
FIG. 6 is a cross sectional view along the II1-II2 line shown in FIG. 2 and showing a positional relationship between the LED and the LGP in the state that the light source unit is pulled out from its home position a half way.
Figure 7:
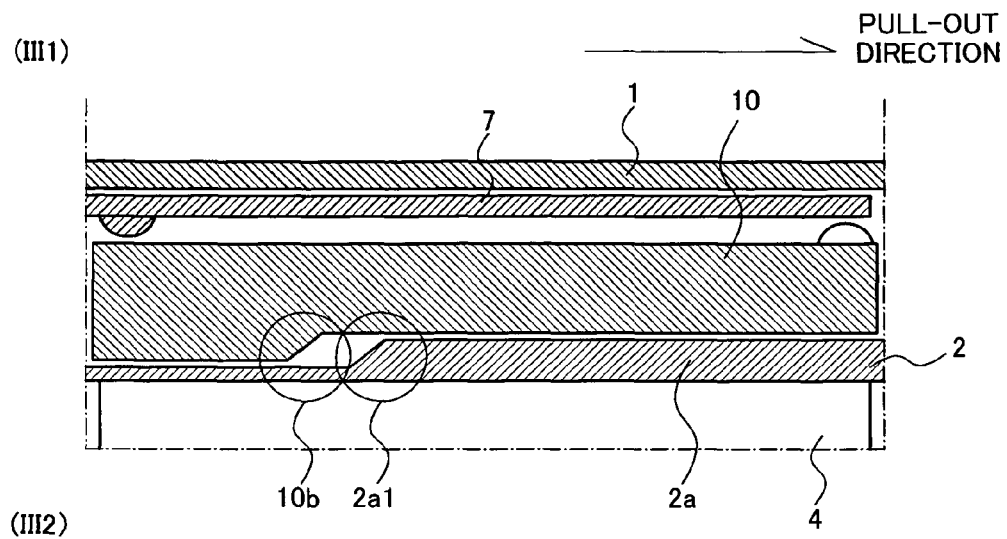
FIG. 7 is a cross sectional view along the III1-III2 line shown in FIG. 2 and showing a positional relationship between the front side of the LED cover and a guide member of a frame in the state that the light source unit is settled at its home position.
Figure 8:
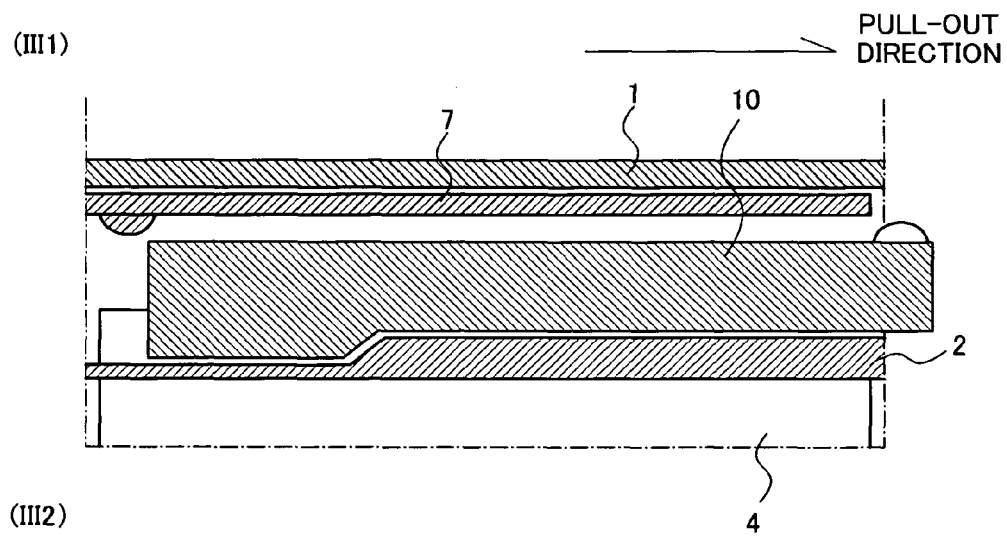
FIG. 8 is a cross sectional view along the III1-III2 line shown in FIG. 2 and showing a positional relationship between the front side of the LED cover and a guide member of a frame in a state that the light source unit is slightly pulled out from the home position.
Figure 9:
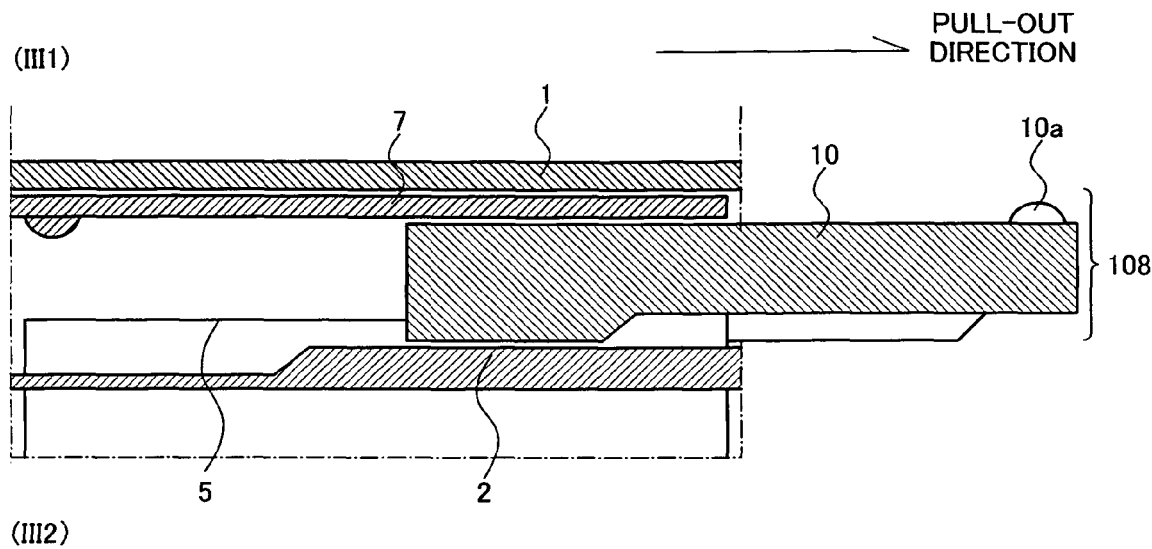
FIG. 9 is a cross sectional view along the III1-III2 line shown in FIG. 2 and showing a positional relationship between the front side of the LED cover and a guide member of a frame in a state that the light source unit is pulled out from the home position a half way.
Figure 10:
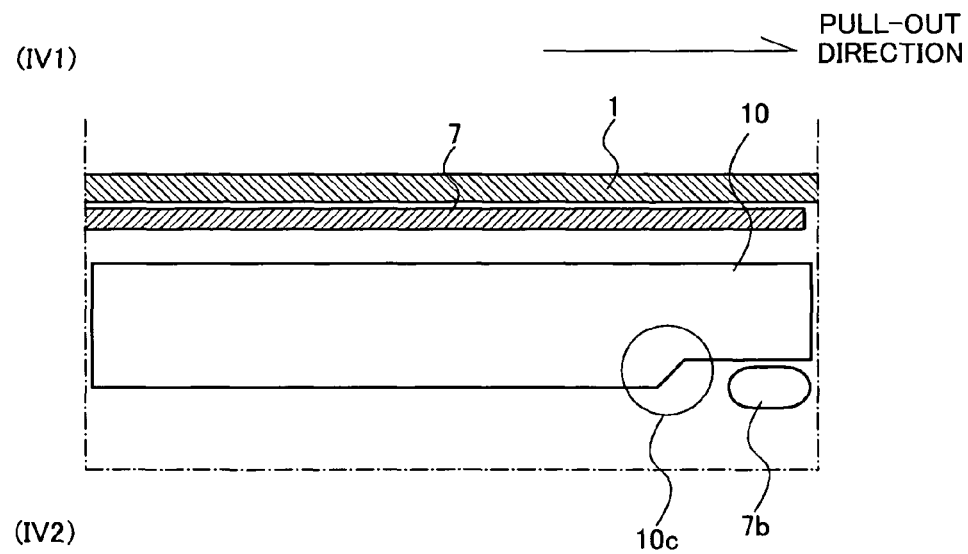
FIG. 10 is a cross sectional view along the IV1-IV2 line shown in FIG. 2 and showing a positional relationship between the rear side of the LED cover and a guide member of a rear cover in the state that the light source unit is settled at the home position.
Figure 11:
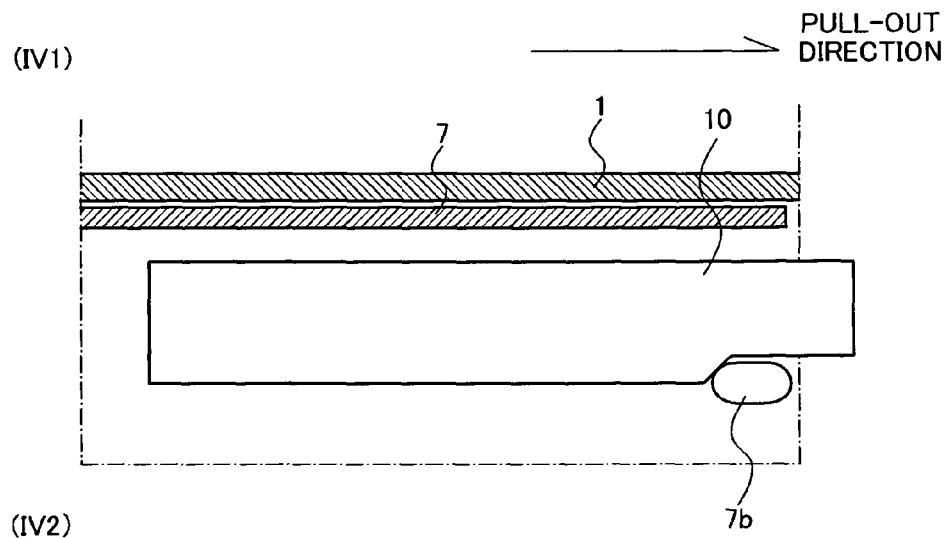
FIG. 11 is a cross sectional view along the IV1-IV2 line shown in FIG. 2 and showing a positional relationship between the rear side of the LED cover and a guide member of a rear cover in a state that the light source unit is slightly pulled out from the home position.
Figure 12:
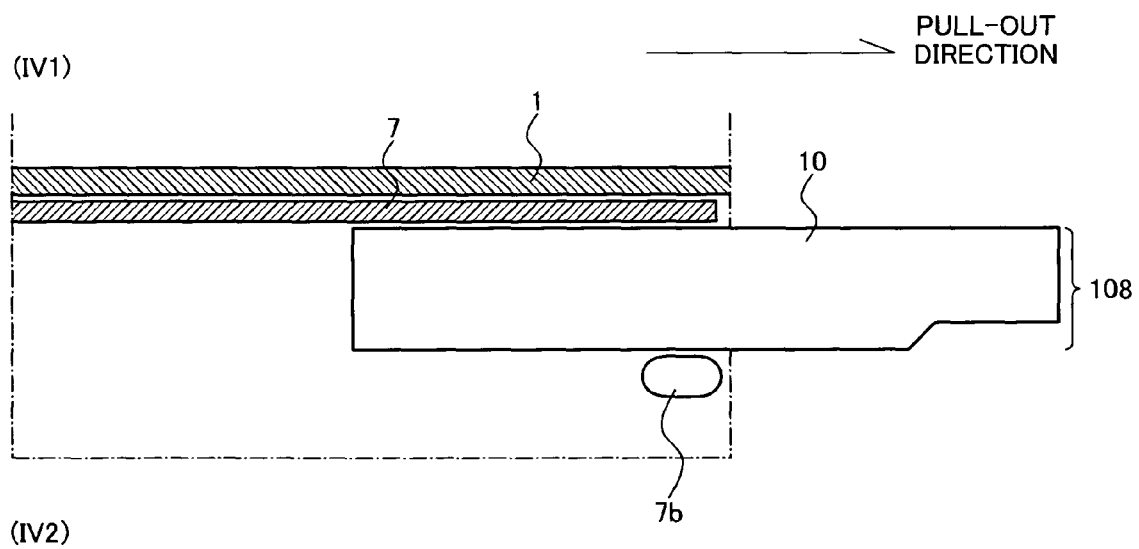
FIG. 12 is a cross sectional view along the IV1-IV2 line shown in FIG. 2 and showing a positional relationship between the rear side of the LED cover and a guide member of a rear cover in a state that the light source unit is pulled out from the home position a half way.

First, a backlight module and an LCD device according to the first exemplary embodiment of the present invention will be described with reference to FIG. 1 through FIG. 12. In FIG. 1, a perspective view of a schematic structure of the LCD device of this exemplary embodiment is shown. FIG. 2 is a cross sectional view along the I1-I2 line shown in FIG. 1, and FIG. 3 is a cross sectional view of the light source unit along the II1-II2 line shown in FIG. 2. FIG. 4 to FIG. 6 are cross sectional views along the II1-II2 line shown in FIG. 2 and indicate a positional relationship between the LED 8 and the LGP 5. FIG. 7 to FIG. 9 are cross sectional views along the III1-III2 line shown in FIG. 2 and indicate a positional relationship between the front side (the liquid crystal display surface side) of the LED cover 10 and a guide member 2a of a frame 2. FIG. 10 to FIG. 12 are cross sectional views along the IV1-IV2 line shown in FIG. 2 and indicate a positional relationship between the rear side (opposite to liquid crystal display surface) of the LED cover 10 and a guide member 7b of a rear cover 7. FIG. 4, FIG. 7 and FIG. 10 show a state that the light source unit is settled at home position of the backlight module. FIG. 5, FIG. 8 and FIG. 11 show the state that the light source unit is pulled out slightly from the backlight module. FIG. 6, FIG. 9 and FIG. 12 show the state that the light source unit is pulled out half from the backlight module.

As shown in FIG. 1 and FIG. 2, an LCD device 130 of this exemplary embodiment is provided with a liquid crystal display (LCD) panel 3 and a backlight module which illuminates the LCD panel 3. The LCD panel 3 and the backlight module are accommodated in a module case 172. The LCD panel 3 includes liquid crystal material sandwiched between two substrates. One substrate is provided with switching elements such as TFTs (Thin Film Transistors) arranged in a matrix pattern, and the other substrate is provided with a color filter and a black matrix. The backlight module includes a light source unit 108, a light guide plate (LGP) 5 guiding the emitted light to the surface of the LCD panel 3, a reflective sheet 6 and an optical sheet 4. The module case 172 includes a rear cover 7 at a rear side thereof, a frame member 2 which settling the positions of the LCD panel 3, and a front cover member 1 on the display surface side.

The feature of the exemplary example of the present invention is a mechanism for insertion and ejection of the light source unit 108, i.e., a detachable light source unit 108, therefore, those structures and material of the other members of the LCD panel 3 such as the LGP 5, the reflective sheet 6 and the optical sheet 4 are not restricted to the particular case shown in this specification. Hereinafter, it is explained in detail about the detachable light source unit.

As shown in FIG. 3, the detachable light source unit 108 includes a wiring substrate 9 provided with an array of the LEDs 8 as an array of plurality of point light sources, the LED cover 10 and spacers 12A and 12B. The wiring substrate 9 with the LEDs 8 is mounted on an inside surface of the LED cover 10, and the spacers 12A and 12B are also mounted on the inside surface of the LED cover 10 at both ends thereof.

As shown in FIG. 4, the LGP 5 is provided with an optical incident plane 5c at the light source unit side where the light from light emitting surfaces 8a (8a1 and 8a2) of the LEDs 8 are incident thereon. The LGP 5 is further provided with contact surface areas 5a and 5b adjacent to the optical incident plane 5c such that the spacers 12A and 12B of the light source unit 108 are contacted thereto. A protruded portion 7a formed by using such as a drawing process is provided on an internal surface of the rear cover 7 at a position opposing to the contact surface area 5a of the LGP 5. On the other hand, the LED cover 10 is provided with a protruded portion 10a formed by using such as the drawing process at outer surface of a side wall member of the LED cover 10 opposing to the contact surface area 5b of the LGP 5. By pushing a protruded portion 7a toward the outer surface of the side wall member of the LED cover 10, while pushing the protruded portion 10a toward inner surface of the rear cover 7, the spacers 12A and 12B are forced to contact with the contact surface areas 5a and 5b of the LGP 5. Here, the optical incident plane 5c of the LGP 5 is an effective area of the light emitting surface of the backlight module, and the contact surface areas 5a and 5b are outside of the effective area of the light emitting surface of the backlight module.

As shown in FIG. 2, the LED cover 10 has a shape like a capital letter of "U" so as to form such a structure that sandwiches the LGP 5 with its open end, while a front side member and a rear side member of the LED cover 10 are surrounded with the frame 2 and the rear cover 7, respectively, and thereby providing a mechanism for guiding the detachable light source unit. As shown in FIG. 7, an inclined portion 10b is provided on the front side of the LED cover 10, that is, on the open end side of the front side member of the LED cover 10, while the frame 2 has a guide member 2a to provide a part of the guide structure during interchanging the light source unit. As shown in FIG. 10, there is an inclined portion 10c on the rear side of the LED cover 10, that is, the open end side of the rear side member of the LED cover 10, while the rear cover 7 has a guide member 7b to provide a part of the guide structure during interchanging the light source unit. Thus, the movement of interchanging (inserting or ejecting) of the light source unit is determined by the LED cover 10 having the guide structures, the guide member 2a of the frame 2, and the guide member 7b of the rear cover 7.

Since each of the LEDs 8 generates heat during emitting light, each LED 8 needs to radiate the generated heat outside. Therefore, it is desirable that the material of the LED cover 10 and the rear cover 7 is composed of good thermal conductive material such as metal.

Next, an interchanging procedure of the light source unit will be described with reference to FIG. 4 to FIG. 12.

In FIG. 4, a rightward arrow shown in the upper right area indicates a ejecting direction or a pull-out direction of the light source unit (the LED unit). The pull-out direction, i.e., an ejecting direction of the LED unit is also shown in the other drawings for reference.

In the normal state (the loaded state) that the light source unit is fitted or settled at the predetermined position, as shown in FIG. 4, the protruded portion 7a of the rear cover 7 pushes the LED cover 10 while the protruded portion 10a of the LED cover 10 pushes the rear cover 7, and thereby pushing the spacers 12A and 12B toward the contact surface areas 5a and 5b of the LGP 5 to fix the light source unit at normal position or home position. If the LGP 5 and the light source unit are fixed each other in parallel, the contact surface areas 5a and 5b would be provided with the same special treatment as in the case for the optical incident plane 5c.

When the light emitting surface of the LED 8 closest to the spacer 12A is designated as 8a1 while the light emitting surface of the LED 8 closest to a spacer 12B is designated as 8a2, the distance between the optical incident plane 5c of the LED 8 and the LGP 5 is determined by a first distance between the light emitting surface 8a1 of the LED 8 and the face of the spacer 12A touching the LGP 5, and a second distance between the light emitting surface 8a2 of the LED 8 and the face of the spacer 12B touching the LGP 5.

Accordingly, when the spacers 12A and 12B are made to have the same height, and all of the LEDs 8 is made to have the same shape of the spacer, the above-mentioned first and second distances become equal, and the light source unit becomes parallel to an optical incident plane 5c of the LGP 5. Despite of the array position of the LEDs 8 in the light source unit, the distance between the optical incident plane 5c and the light emitting surface of the LED 8 becomes fixed distance. By making this distance as small as possible close to zero, it is possible to enter the light of the light source into the LGP 5 to a maximum extent. When there is the special treatment on the light source side, those surfaces either touching the optical incident plane 5a of the LGP 5 or closely arranged thereto would be assumed as the light emitting surface 8a of the LED 8.

In the above-mentioned state, as shown in FIG. 7, the inclined portion 10b of the front side of the LED cover 10 and the guide member 2a of the frame 2 are not engaged. As shown in FIG. 10, the inclined portion 10c of the rear side of the LED cover 10 and the guide member 7b of the rear cover 7 are also not engaged.

Next, as shown in FIG. 5, in the state that the light source unit is pulled out slightly from its home position, the protruded portion 7a of the rear cover 7 does not touch the LED cover 10 any more, and the protruded portion 10a of the LED cover 10 does not touch the rear cover 7 anymore. Therefore, a space area is formed between the LED cover 10 and the side wall portion of the rear cover 7 located at the side of the LCD device, and result in such non-fixing state of the light source unit. At that time, the spacer 12A is located on the contact surface area 5a of the LGP 5.

In this state, as shown in FIG. 8, the inclined portion 10b of the LED cover 10 and a circular arc portion 2a1 of the guide member 2a of the frame 2 comes to the touched position on the front side of the LED cover 10. As shown in FIG. 11, an inclined portion 10c of the LED cover 10 and the guide member 7b of the rear cover 7 come to the touched position on the rear side of the LED cover 10.

Next, as shown in FIG. 6, in the state that the light source unit is pulled out halfway from its home position, the distance between the light emitting surface 8a of the LED 8 and the optical incident plane 5c of the LGP 5 increases, and the space between the LED cover 10 and the side wall portion of the rear cover 7 decreases conversely. At that time, the spacer 12A is located on the optical incident plane 5c of the LGP 5.

In this state, as shown in FIG. 9, the LED cover 10 runs over the frame 2 in the front side of the LED cover 10. As shown in FIG. 12, on the other hand, the LED cover 10 runs over the guide member 7b of the rear cover 7 in the rear side of the LED cover 10. Accordingly, the distance between the light emitting surface 8a of the LED 8 and the optical incident plane 5c of the LGP 5 becomes large, and thus the LED 8 does not touch the optical incident plane 5c of the LGP 5 at the time of the light source unit is exchanged.

The light source unit is then pulled out with the positional relationship shown in FIG. 6, FIG. 9 and FIG. 12. At the time of inserting the light source unit in the module case, it will be the reverse of the above-stated ejecting procedure.

In that way, when the light source unit is fitted at the home position, the protruded portion 10a is pushing the rear cover 7 while the protruded portion 7a is pushing the LED cover 10, and thereby closely arranging the light emitting surface 8a of the LED 8 and the optical incident plane 5c of the LGP 5. At the time of interchanging the light source unit, the protruded portion 10a is spaced apart from the rear cover 7 while the protruded portion 7a is spaced apart from the LED cover 10, and the inclined portion 10b is engaged with the circular arc part 2a1 while the inclined portion 10c is engaged with the guide member 7b, and thereby producing a gap between the light emitting surface 8a of the LED 8 and the optical incident plane 5c of the LGP 5. Accordingly, it is possible to prevent a decline of a utilization efficiency of the emitted light of the LEDs, and prevent damage of the LEDs at the time of exchanging them.

Exemplary Embodiment 2

Figure 25:
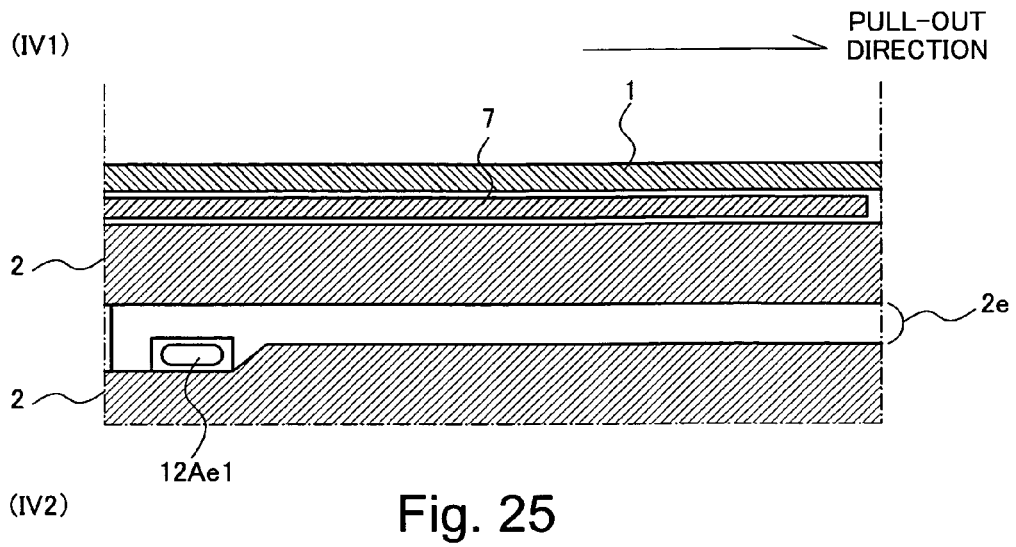
FIG. 25 is a cross sectional view along the V1-V2 line shown in FIG. 24.
Figure 26:
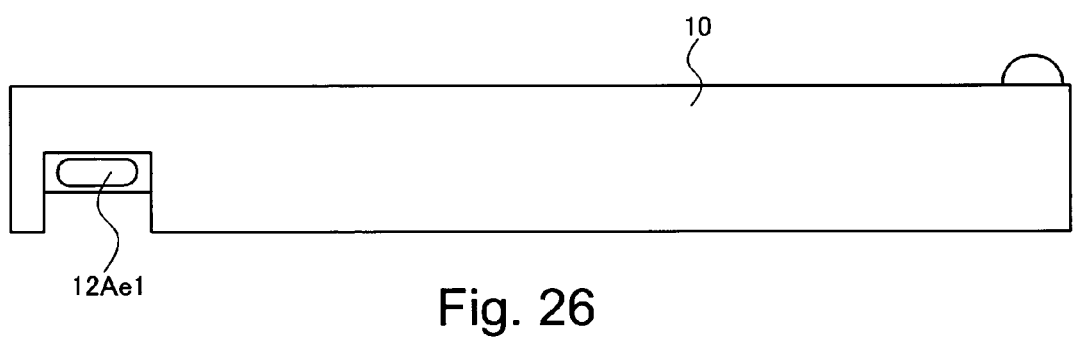
FIG. 26 is an outside drawing of the light source unit.
Figure 27:
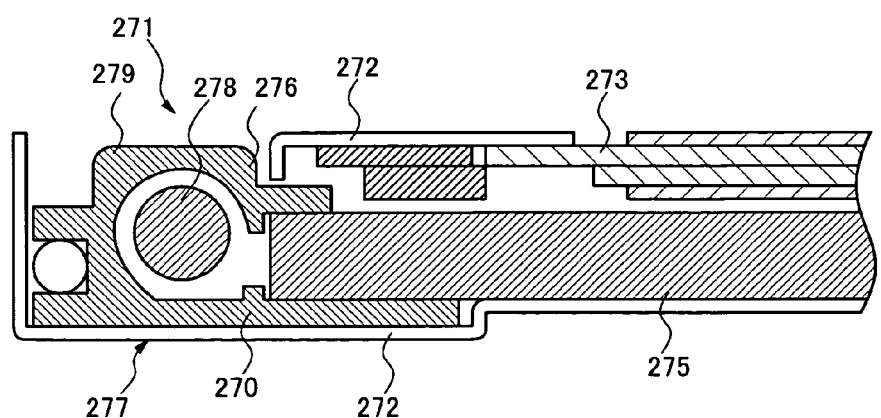
FIG. 27 is a cross sectional view showing the structure of the LCD device on patent document 1 (Japanese Patent Application Laid-Open No. 1994-051293).
Figure 28:
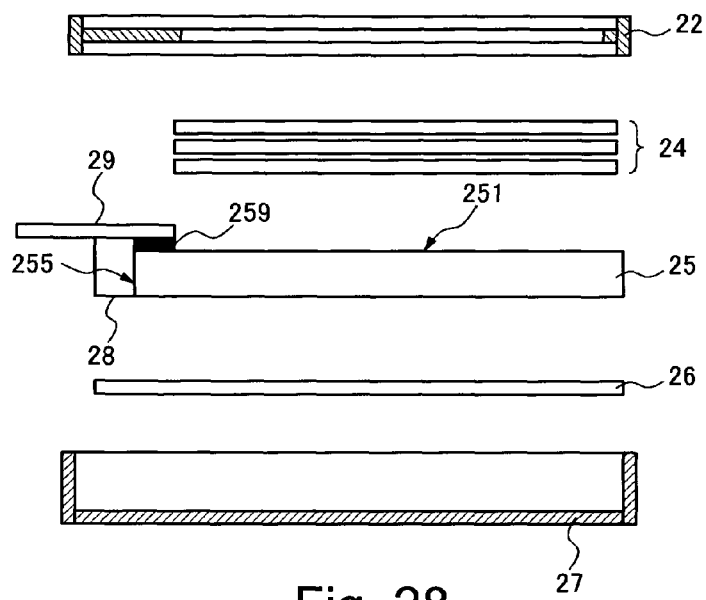
FIG. 28 is an exploded view showing the structure of the backlight module on patent document 2 (Japanese Patent Application Laid-Open No. 2005-321586).
Figure 29:
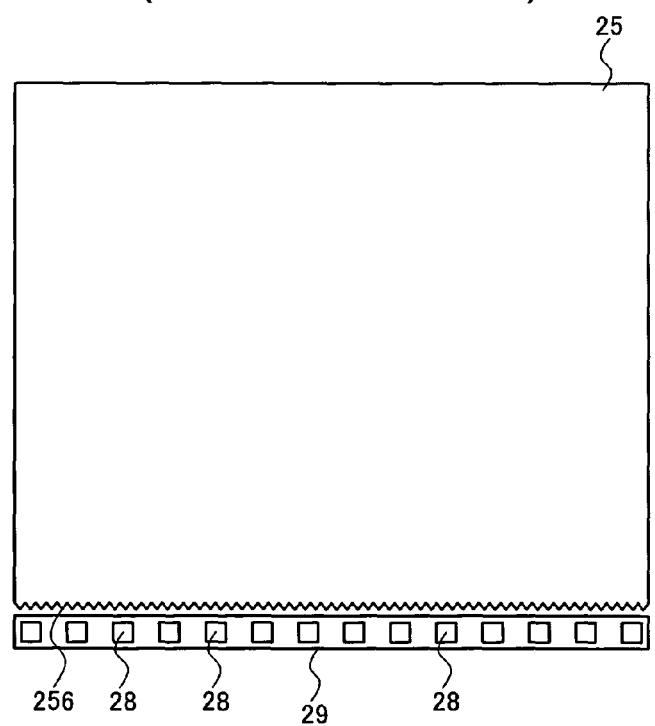
FIG. 29 is a plan view showing the structure of the surface light source device on patent document 3 (Japanese Patent Application Laid-Open No. 2006-302710).
Figure 30:
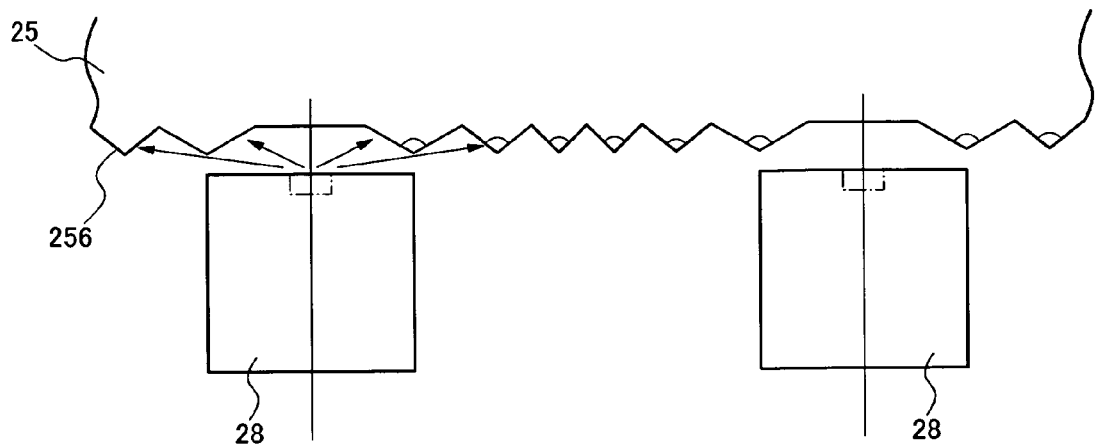
FIG. 30 is a partial expanded plan view of the LGP and the LED of FIG. 29.
Figure 31:
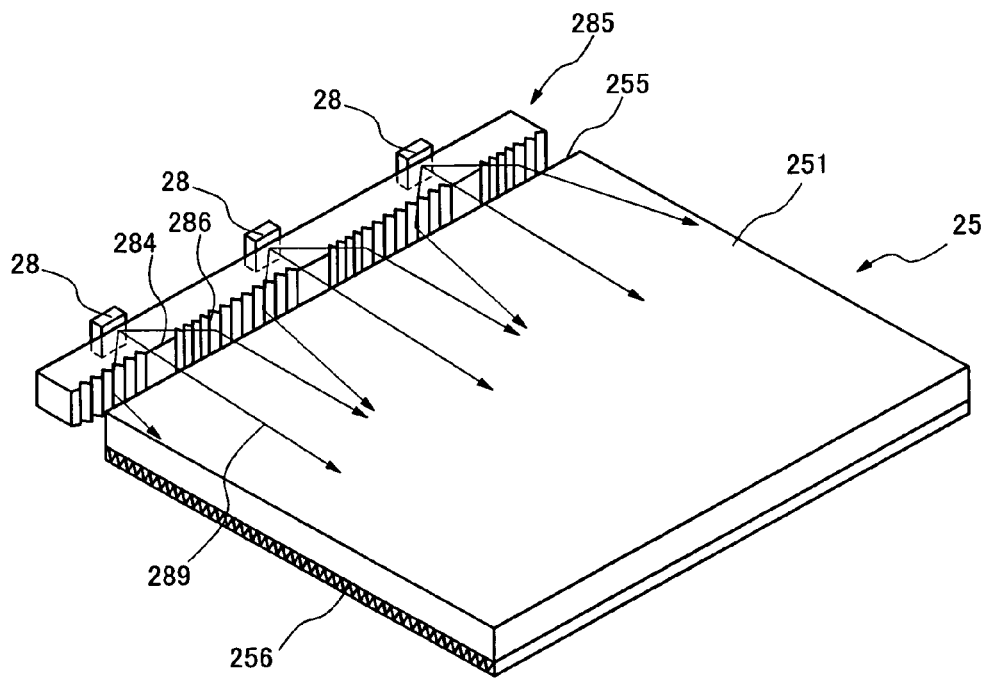
FIG. 31 is a perspective view showing the structure of the backlight module on patent document 4 (Japanese Patent Application Laid-Open No. 2004-213025).
Figure 32:
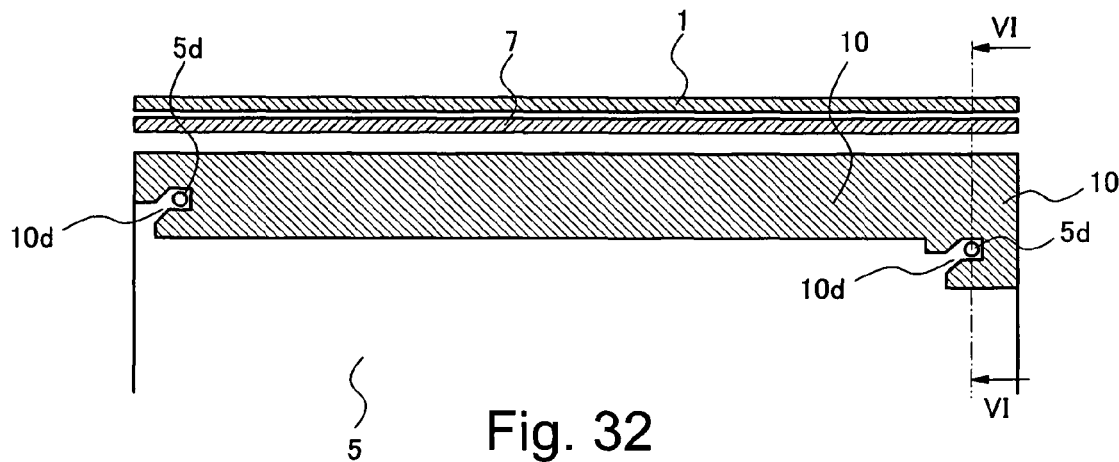
FIG. 32 is the LED cover according to the third exemplary embodiment of the present invention and showing the structure of the LGP.
Figure 33:
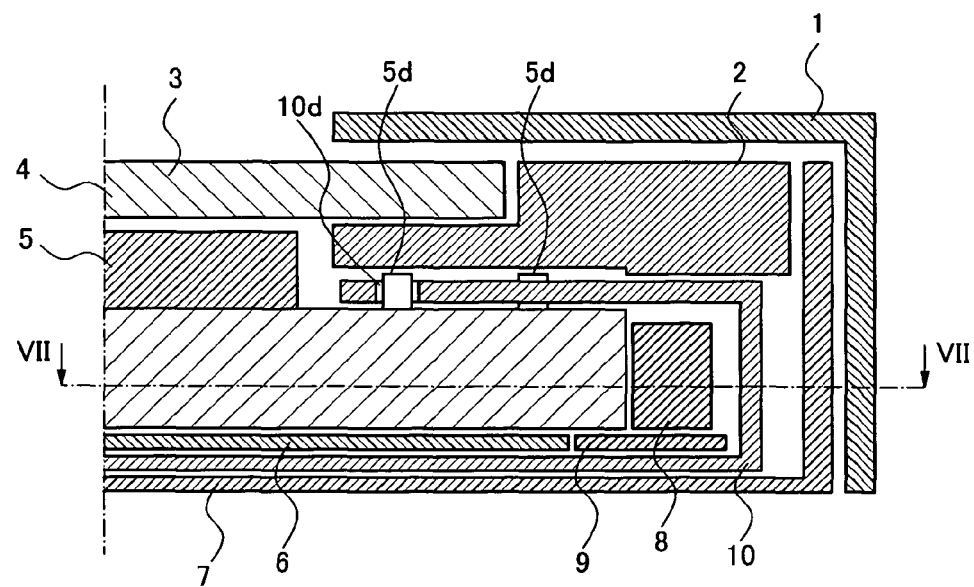
FIG. 33 is a cross sectional view along the VI-VI line shown in FIG. 32.

Next, a backlight module and an LCD device according to the second exemplary embodiment of the present invention will be described with reference to FIG. 13 through FIG. 26. In FIG. 13, FIG. 14 and FIG. 20 to FIG. 24, the other structures of the LCD device of this exemplary embodiment are shown as cross sectional views. FIG. 15 to FIG. 19 show the other structures of the protruded portion shape, and FIG. 25 and FIG. 26 show the other structures of the guide structure. Further, these exemplary embodiments indicate a variation of the structures of the first exemplary embodiment.

Figure 13:
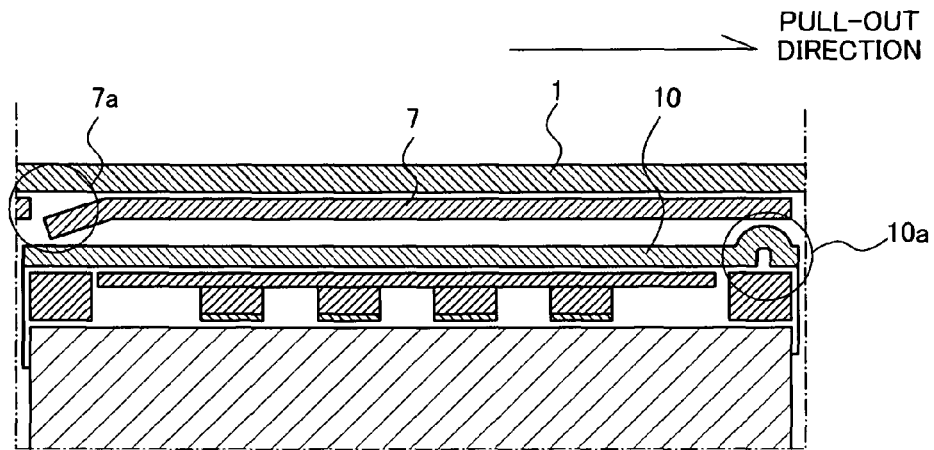
FIG. 13 is a cross sectional view showing the other structure of the LCD device according to an exemplary embodiment of the present invention.
Figure 14:
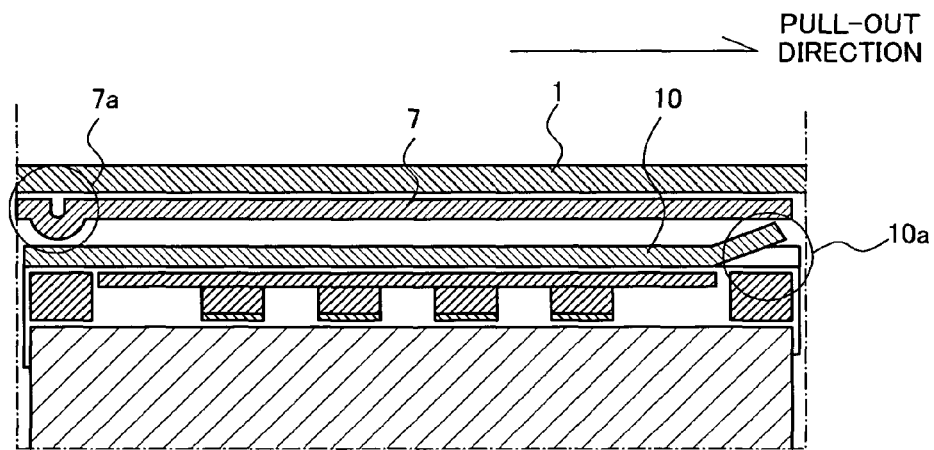
FIG. 14 is a cross sectional view showing the other structure of the LCD device according to an exemplary embodiment of the present invention.
Figure 15A:
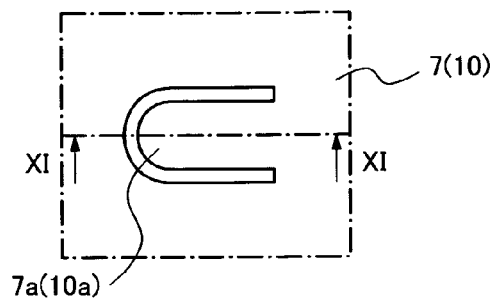
FIG. 15A is a plan view showing the leaf spring structure shown in FIG. 13 and FIG. 14.
Figure 15B:
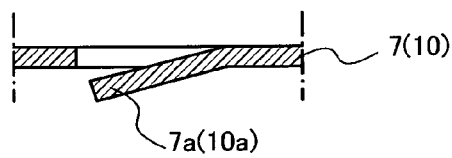
FIG. 15B is a cross sectional view along the XI-XI line shown in FIG. 15A.
Figure 16A:
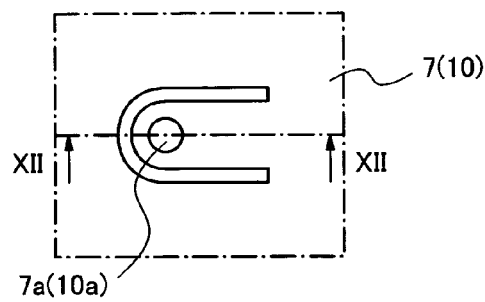
FIG. 16A is a plan view showing other examples of the leaf spring structure in FIG. 13 and FIG. 14.
Figure 16B:
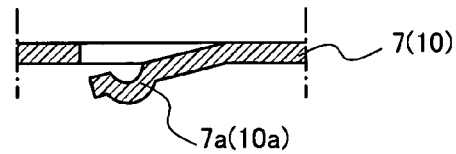
FIG. 16B is a cross sectional view along the XII-XII line shown in FIG. 16A.

In the first exemplary embodiment mentioned above, although the rear cover 7 and the LED cover 10 are made of metal, and the protruded portion 7a of the rear cover 7 and the protruded portion 10a of the LED cover 10 are formed by using drawing process, the protruded portion 7a of the rear cover 7 would be made to have a leaf spring structure as shown in FIG. 13 or the protruded portion 10a of the LED cover 10 would be made to have a leaf spring structure as shown in FIG. 14. Details of this leaf spring structure is shown in FIG. 15A as a plan view and FIG. 15B showing a cross sectional view of FIG. 15A along the XI-XI line. Other structure that has an additional protruded portion at a tip of the leaf spring structure is also available as shown in FIG. 16A as a plan view and FIG. 16B showing a cross sectional view of FIG. 16A along the XII-XII line.

Although not shown, the shaping of the protruded portion may be made by using plastic resin material, and it would be incorporated in there either by using adhesive agent or fit-in mechanism.

Figure 17A:
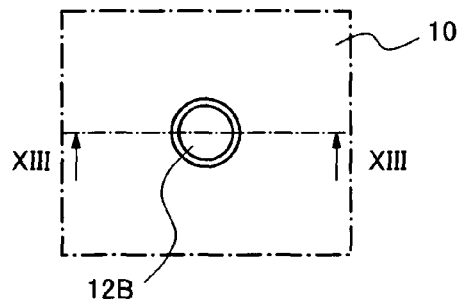
FIG. 17A is a plan view showing other examples with the protruded portion shape according to an exemplary embodiment of the present invention.
Figure 17B:
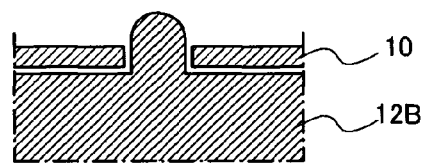
FIG. 17B is a cross sectional view along the XIII-XIII line shown in FIG. 17A.

Instead of providing the protruded portion 10a for the LED cover 10, it is possible to make a such structure that the spacer 12B is provided with a protruded portion and being protruded through a hole formed on the LED cover 10 as shown in FIG. 17A as a plan view and FIG. 17B showing a cross sectional view of FIG. 17A along the XIII-XIII line.

Figure 18:
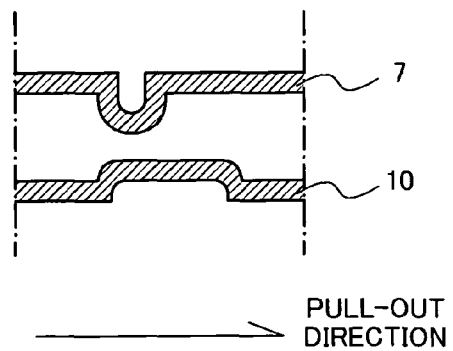
FIG. 18 is a cross sectional view showing other examples with the protruded portion shape in an exemplary embodiment of the present invention.
Figure 19:
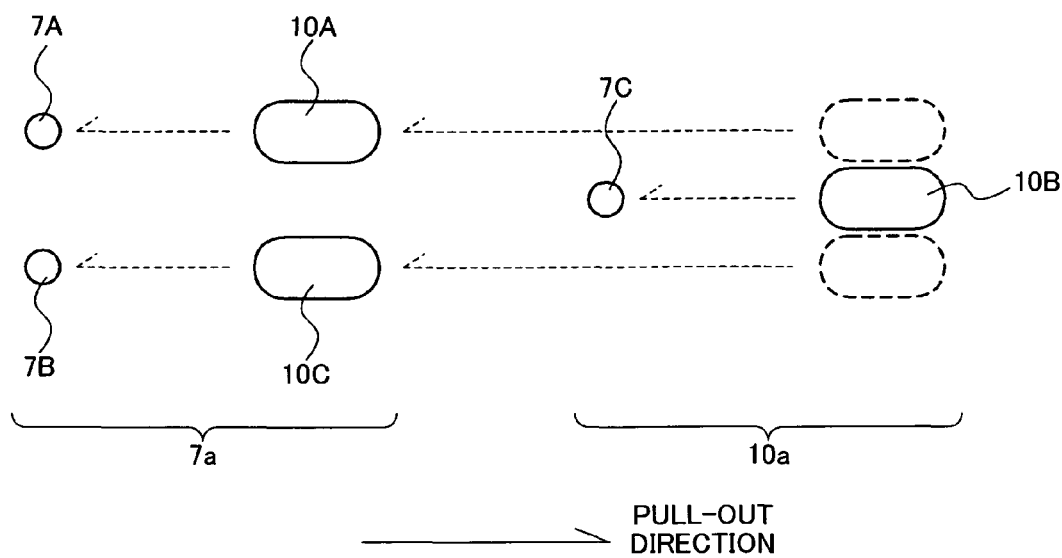
FIG. 19 is a plan view showing arrangement in a protruded portion in FIG. 18.

As shown in FIG. 18, these protruded portions may be provided on both of the rear cover 7 and the LED cover 10. In this case, as shown in FIG. 19, it is necessary to arrange a protruded portion (the 7a side) on the inside side so as not to touch a protruded portion (the 10a side) in the inlet side during exchanging the light source unit. Although not shown, when there are protruded portions on both sides, it can be made to have such structure that one is made of a protruded portion while the other is made of a leaf spring, or vice versa.

Although not shown, the shape of the circular arc part 2a1 of the frame 2, the guide member 7b of the rear cover 7 and the inclined portions 10b and 10c of the LED cover 10 is not limited to the shape shown in the drawings, but it may be either shape of an arc or inclination, and its combination would be the combination of the arc and the arc or the combination of the inclination and the inclination. Further, the guide member 2a of the frame 2 may be formed to have the same shape as the guide member 7b of the rear cover 7.

Figure 20:
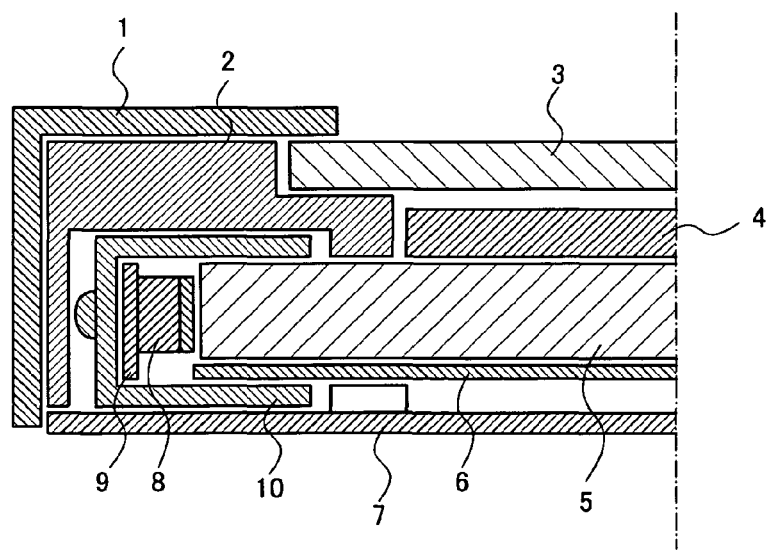
FIG. 20 is a cross sectional view showing the other structure of the LCD device according to an exemplary embodiment of the present invention.

Instead of extending the rear cover 7 toward a side wall portion as shown in FIG. 2, the frame 2 may be extended to the side wall portion as shown in FIG. 20.

Figure 21:
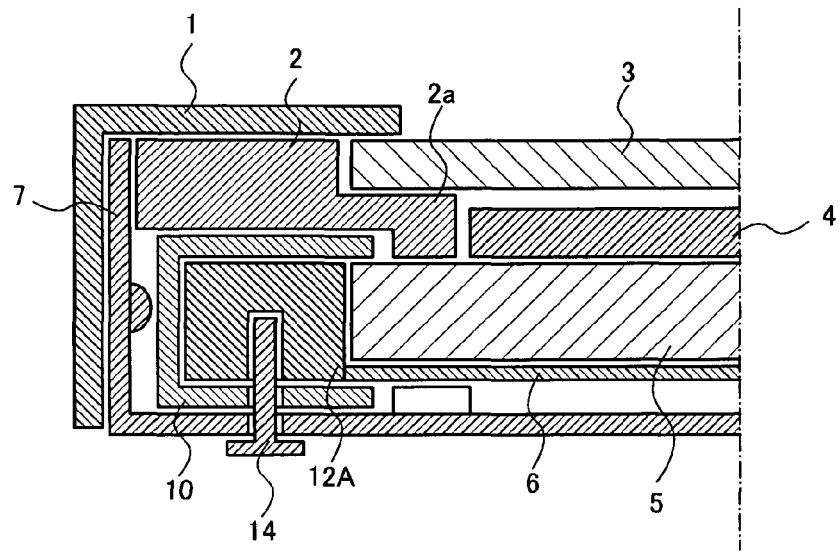
FIG. 21 is a cross sectional view showing the other structure of the LCD device according to an exemplary embodiment of the present invention.

As shown in FIG. 21, a through hole may be provided in the rear cover 7 and the LED cover 10, respectively, and set up a screw hole in either of the spacers 12A and 12B or both of them and fix it to the LED cover 10 by using a screw 14. By using such configuration, a clearance at the time of interchanging the light source unit is eliminated, and close-contact state between the rear cover 7 and the LED cover 10 is increased, and heat-radiating property of the LEDs 8 is increased.

Figure 22:
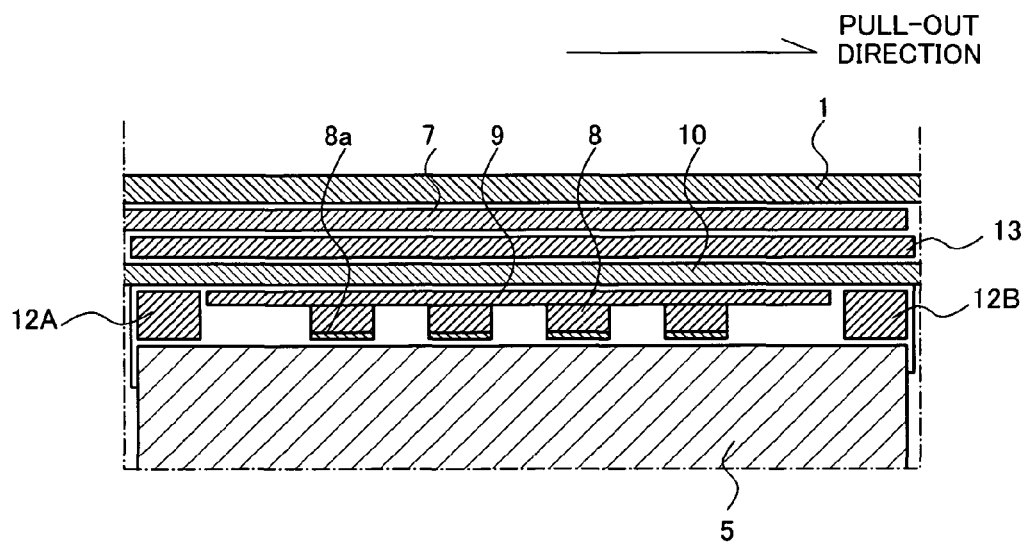
FIG. 22 is a cross sectional view showing the other structure of the LCD device according to an exemplary embodiment of the present invention.

As shown in FIG. 22, by omitting the protruded portions of the rear cover 7 and the LED cover 10, it may be made to form such structure that a thermal conductivity member, that is, an additional spacer 13 made of good thermally conductive material is inserted between the rear cover 7 and the LED cover 10 so as to push the light source unit toward the LGP 5 and thereby fixing them. Using such structure, radiation path area is increased and the heat-radiating property of the LEDs 8 can be improved.

The heat-radiating property can be further improved by such a hybrid structure using a screw fastening structure with the screw 14 shown in FIG. 21 and a spacer-inserted structure with the spacer 13 shown in FIG. 22.

Figure 23:
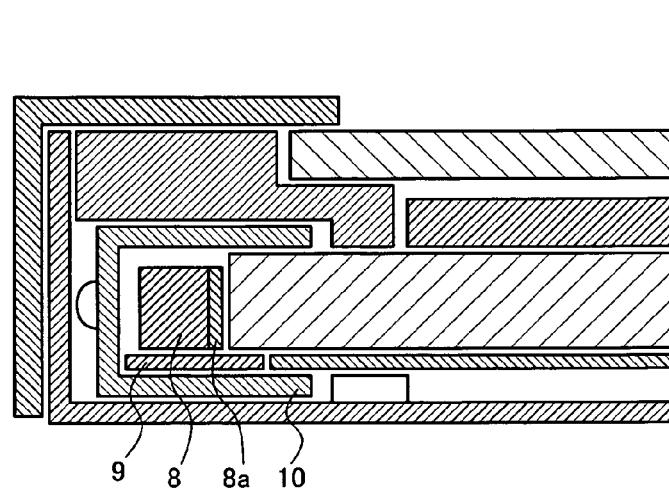
FIG. 23 is a cross sectional view showing the other structure of the LCD device according to an exemplary embodiment of the present invention.

Although the LED of a so called top view type (the light emitting surface is located opposite side of the mounting surface of the LED) has been described heretofore, it can also be applied to another type of LED such as a side view type (the light emitting surface is arranged so as to be parallel to the mounting surface of the LED) as shown in FIG. 23. In a constructional example shown in FIG. 23, although the position of the wiring substrate 9 is located at an inside region of the rear side of the LED cover 10, it is available to place it on the inside region of the front side of the LED cover 10.

Figure 24:
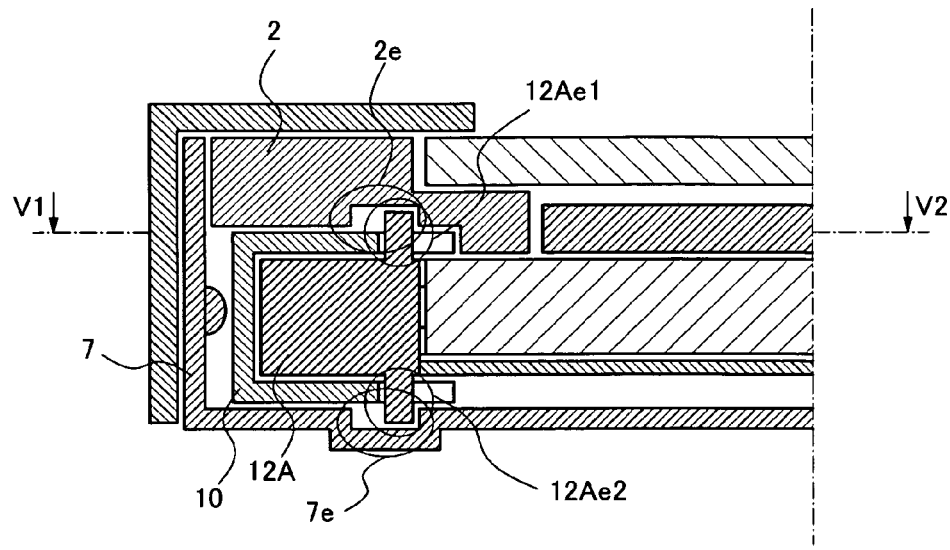
FIG. 24 is a cross sectional view showing the other structure of the LCD device according to an exemplary embodiment of the present invention.

As shown in FIG. 24, another guide structure can be made by providing a protruded portion 12Ae1 on the front side of the spacer 12A, a protruded portion 12Ae2 on the rear side of the spacer 12A, a groove 2e on the frame 2, and a groove 7e on the rear cover 7, respectively. A cross sectional view along V1-V2 line shown in FIG. 24 is shown in FIG. 25. A schematic view of the light source unit is shown in FIG. 26. Although the groove 7e is not shown in detail like the groove 2e, it is the same system as shown in FIG. 25.

Exemplary Embodiment 3

Figure 44:
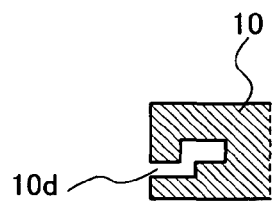
FIG. 44 is a plan view showing the other structure of the guide structure according to an exemplary embodiment of the present invention.
Figure 45:
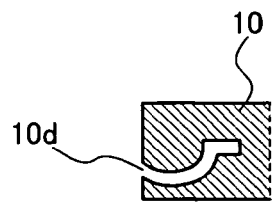
FIG. 45 is a plan view showing the other structure of the guide structure according to an exemplary embodiment of the present invention.

Next, a backlight module and an LCD device according to a third exemplary embodiment of the present invention will be described with reference to FIG. 32 through FIG. 45. Each of FIG. 32 to FIG. 43 is either a cross sectional view or a plan view showing the other structure of the LCD device of this exemplary embodiment. FIG. 44 and FIG. 45 show the other structures of the guide structure.

In the first and second exemplary embodiments mentioned above, the structure with which the LED cover 10, the rear cover 7 and the frame 2 are engaged each other. In this exemplary embodiment, however, the LED cover 10 and the LGP 5 are engaged each other in addition to or instead of the structure of the first and second exemplary embodiments.

For example, as shown in FIG. 32, FIG. 33, FIG. 40 and FIG. 41, at least one edge portion (desirably, both end portions) of the LED cover 10 in a direction of ejecting or inserting of the detachable light source unit is provided with a notch portion 10d which extends in the ejecting direction of the light source unit. The notch is inclined such that its distance from the light incident surface of the LGP 5 is gradually decreased, i.e., the open side of the notch is located far from the light incident surface of the LGP 5 than the end side of the notch. On the light output surface or opposed surface of the LGP 5 close to the light incident side is provided with a protruded portion 5d so as to enable to couple with the slot 10d at the time of settling the light source unit at its home position.

Figure 35:
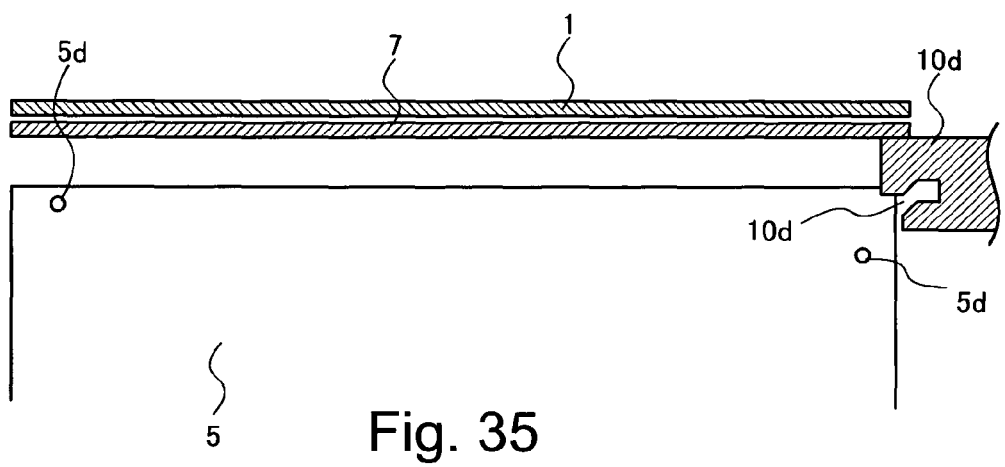
FIG. 35 is a plan view showing operation at the time of inserting or ejecting the LED cover.
Figure 36:
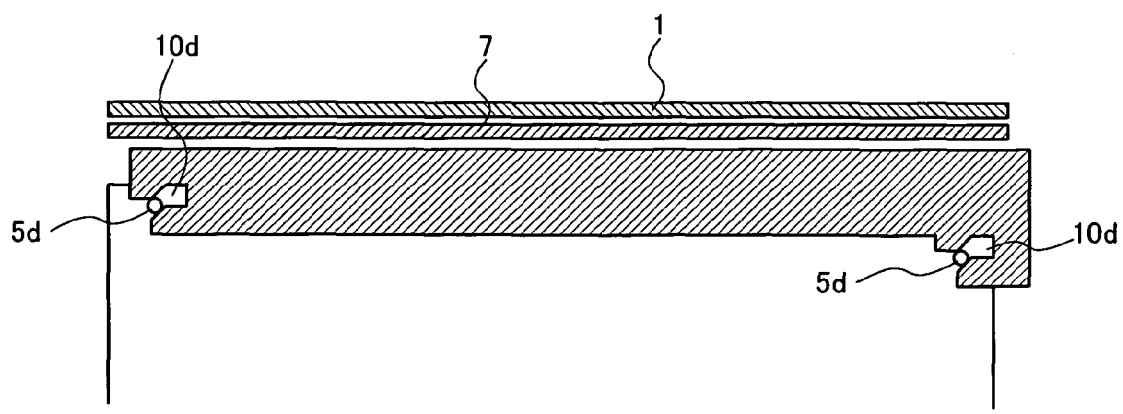
FIG. 36 is a plan view showing operation at the time of inserting or ejecting the LED cover.

As shown in FIG. 35, during inserting process of the detachable light source unit, the light source unit is slid into the case by pushing the rear cover 7. Prior to a final stage of the inserting process, the protruded portion 5d of the LGP 5 is located at the entrance of the notch portion 10d of the LED cover 10 as shown in FIG. 36 so as to be fitted therein. After that, the LED cover 10 is further slid into the case such that the protruded portion 5d of the LGP 5 is sliding into the notch portion 10d.

Figure 34:
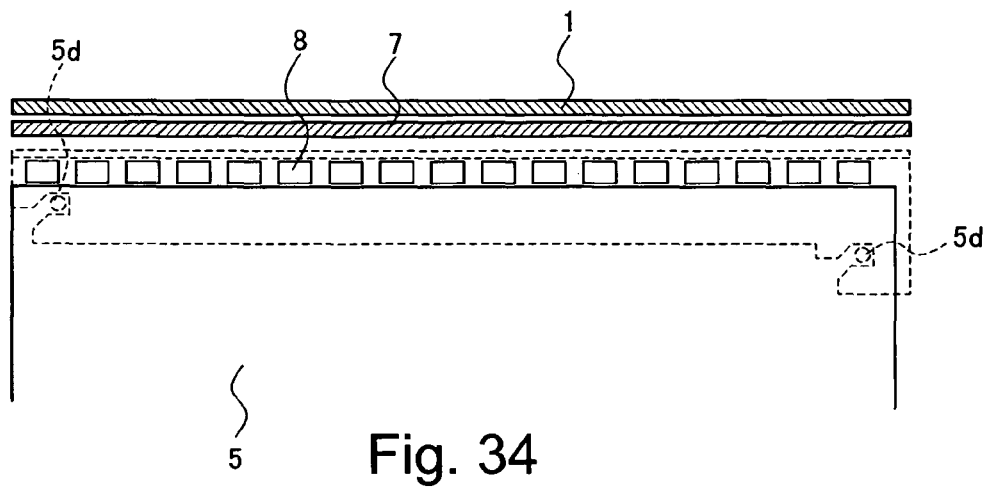
FIG. 34 is a plan view which shows a section along the VII-VII line of FIG. 33 from the top.
Figure 37:
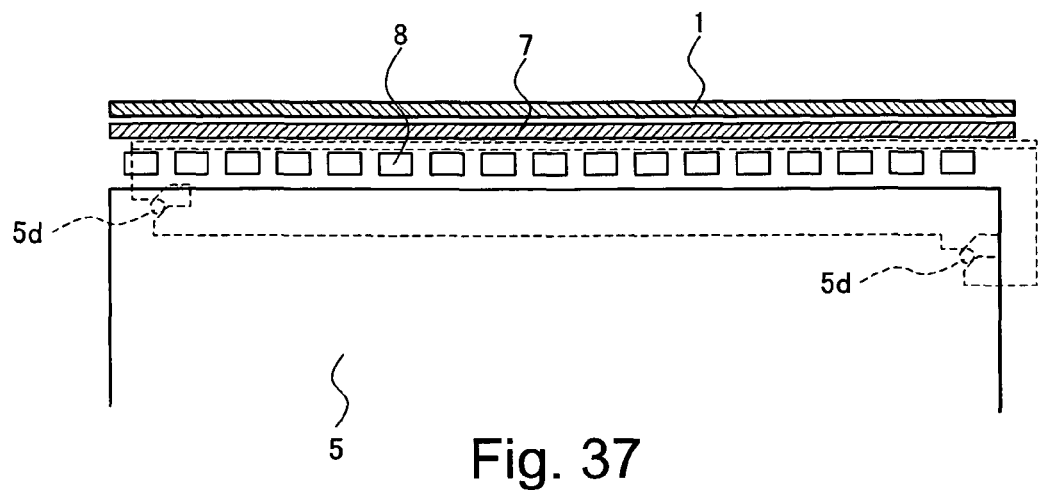
FIG. 37 is a plan view which shows a section along the VII-VII lines of FIG. 33 from the top.
Figure 38:
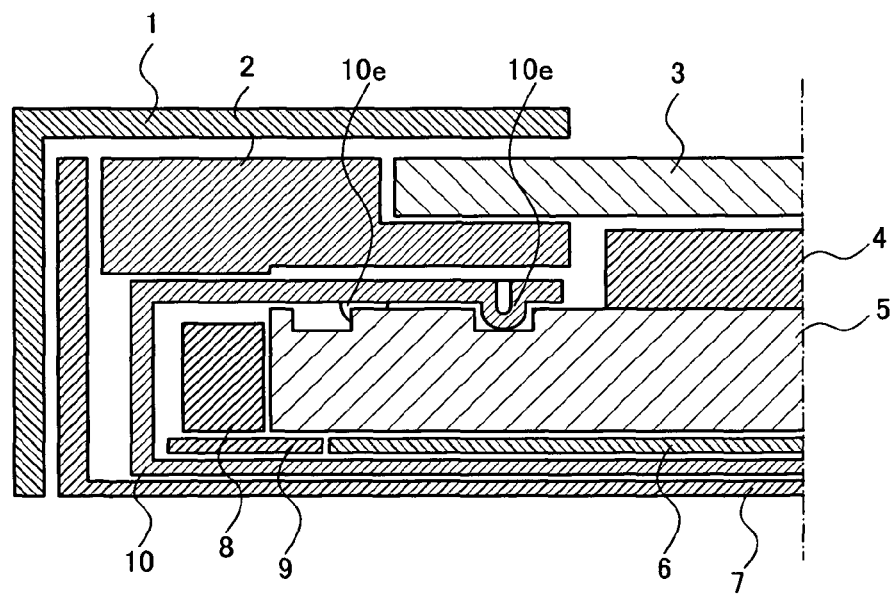
FIG. 38 is a cross sectional view showing the other structure of the LCD device according to the third exemplary embodiment of the present invention.
Figure 39:
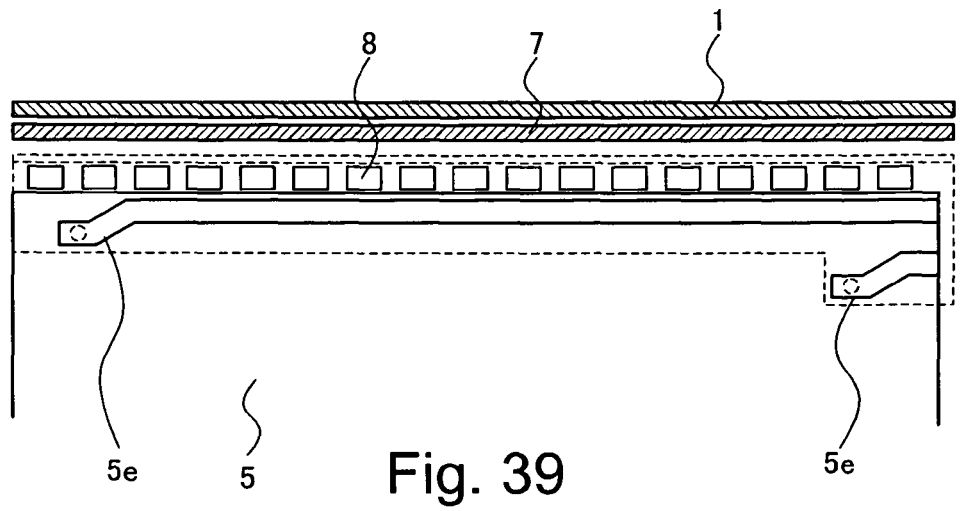
FIG. 39 is a plan view showing the positional relationship between the LED and the LGP according to the third exemplary embodiment of the present invention.
Figure 40:
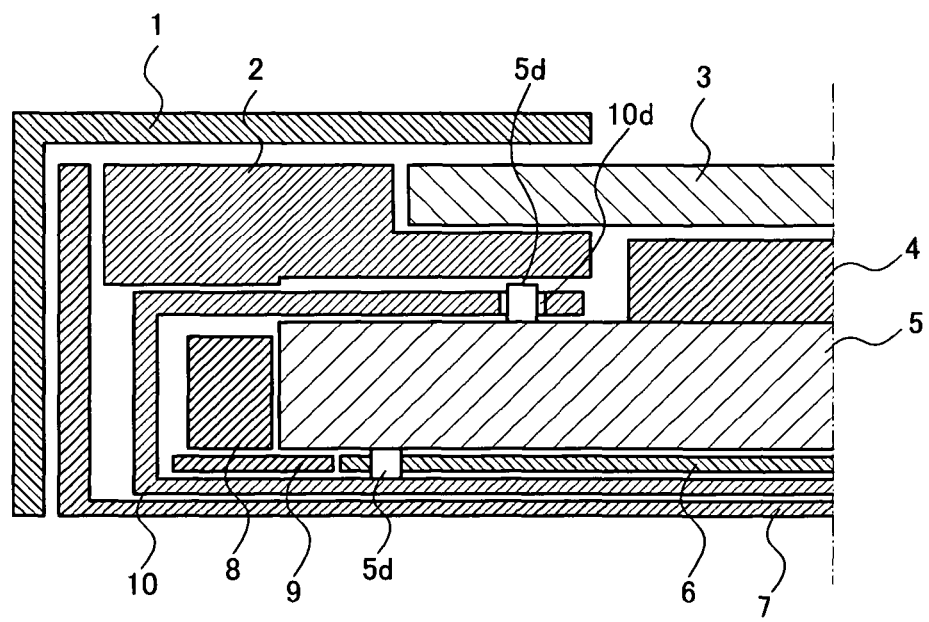
FIG. 40 is a cross sectional view showing the other structure of the LCD device according to the third exemplary embodiment of the present invention.
Figure 41:
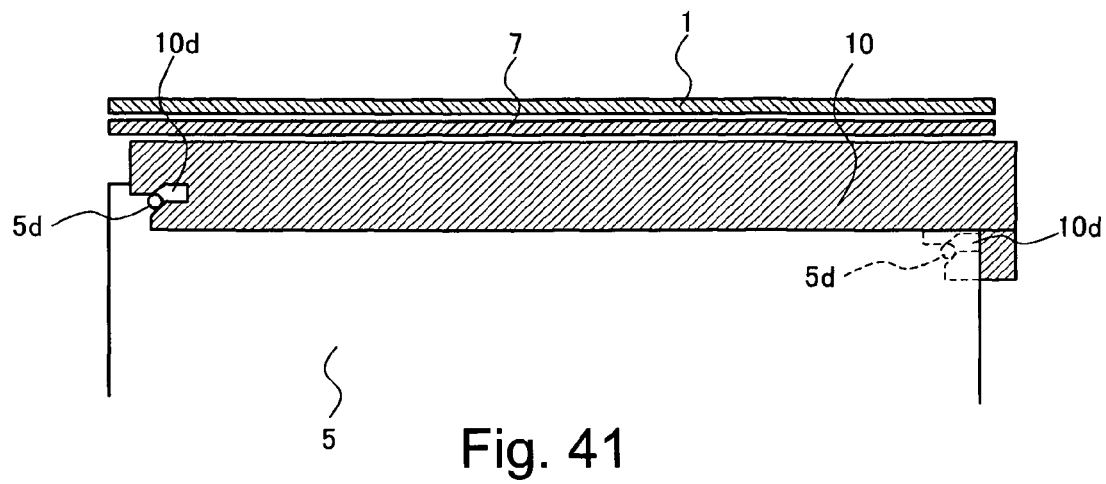
FIG. 41 is a plan view showing the structure of the LED cover and the LGP according to the third exemplary embodiment of the present invention.
Figure 42:
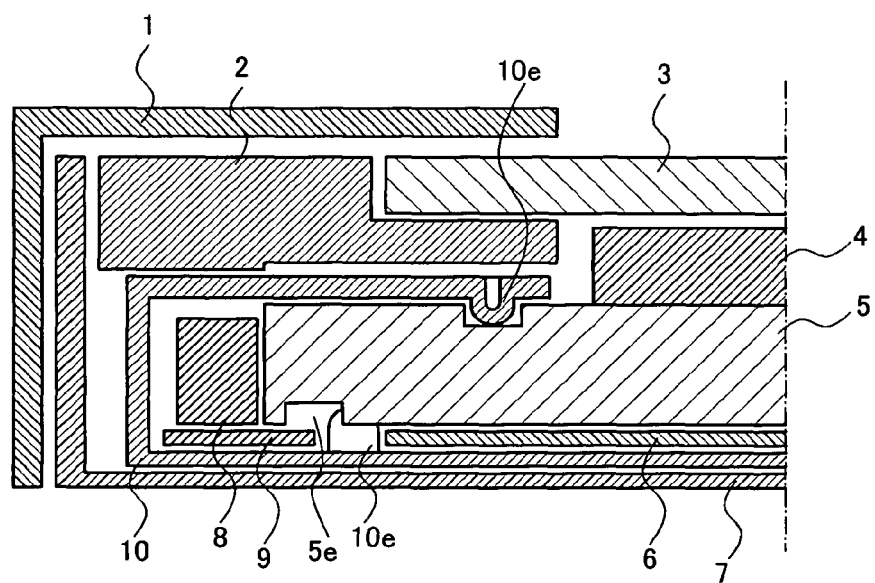
FIG. 42 is a cross sectional view showing the other structure of the LCD device according to the third exemplary embodiment of the present invention.
Figure 43:
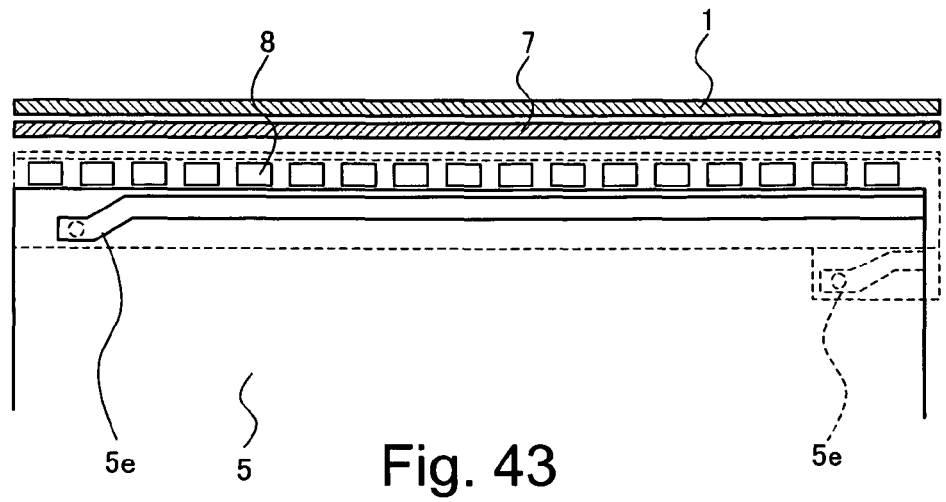
FIG. 43 is a plan view showing the positional relationship between the LED and the LGP according to the third exemplary embodiment of the present invention.

In this structure, the LGP 5 and the LED are separated from each other on the way of the inserting process as shown in FIG. 37. But, after finishing the inserting process, the LGP 5 and the LED can be closely positioned as shown in FIG. 34. On the way of the ejecting process of the LED cover 10, a reverse operation of the above-mentioned operation is performed. The shape of the notch portion 10d formed on the LED cover 10 is not limited to those shape shown in the above-mentioned drawings, but can be made to have the shapes shown in FIG. 44 and FIG. 45, for example.

Other different structures are shown in FIG. 38, FIG. 39, FIG. 42 and FIG. 43, where one or two grooves 5e (desirably, two) are provided on the LGP 5. Each of the grooves 5e is extending along the ejecting direction, i.e., the ejecting direction of the light source unit and it is designed to have an inclined portion which gradually approach toward the incident surface of the LGP 5 along the ejecting direction. On the light output surface or opposed surface of the LED cover 10 close to the light incident side is provided with a protruded portion 10e so as to enable to couple with the grooves 5e at the time of settling the light source unit at its home position.

During inserting process of the detachable light source unit, the protruded portion 10e of the LED cover 10 is slid into the groove 5e of the LGP 5. Prior to a final stage of the inserting process, the protruded portion 10e of the LED cover 10 is fitted in another groove 5e of the LGP 5. After that, the LED cover 10 is further slid into the case such that the protruded portion 10e of the LED cover 10 is sliding into the groove portion 5e of the LGP 5.

In this structure, the LGP 5 and the LED are also separated from each other on the way of the inserting process. But, after finishing the inserting process, the LGP 5 and the LED can be closely positioned. On the way of the ejecting process of the LED cover 10, a reverse operation of the above-mentioned operation is performed.

Even the structure described above can prevent a decline of a utilization efficiency of the emitted light of the LED like the first exemplary embodiment and prevent damage at the time of interchanging the light source unit. Moreover, in case of this exemplary embodiment, because the LED cover 10 is coupled to the LGP 5, the LED and the LGP 5 can always be fixed constantly each other. By using such structure, in spite of thermal expansion phenomenon, another advantage of enabling to hold the LGP with a two-sided light incidence can be obtained.

The present invention is available for the backlight module enabling the exchange of the light source unit resorting to LEDs as a light source, and for the LCD device using such backlight module.

According to the present invention, because the interval of the optical incident plane of a light emitting surface and the LGP of the LED can be made large when a light source is exchanged, damages on an optical incident plane of the light emitting surface and the LGP of the LEDs and a specially treated section between the LEDs and the LGP can be prevented.

Because the distance of the optical incident plane of the light emitting surface and the LGP of the LEDs can be brought close to zero at the time of fitted stage (at the time of completion of the exchange) of the light source, a decline of a utilization efficiency of the emitted light of the LEDs can be prevented.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A backlight module, comprising:
    a light guide plate housed in a module case, said light guide plate comprising an elongated edge portion for a light incident surface between a pair of principal surfaces thereof;
    a light source unit incorporated in said module case interchangeably so as to slide along a lengthwise direction of said edge portion of said light guide plate, said light source unit comprising a cover member provided with a first protruded portion, said cover member being for holding a plurality of point light sources along said lengthwise direction, a side member of said module case comprising a front side member and a rear side member provided with a second protruded portion and arranged in parallel to said principal surfaces of said light guide plate, and being united together with a side wall member; and
    a coupling member enabling to change a positional relationship between said light guide plate and said light source unit, said coupling member having such a structure that a first distance between a light emitting surface of said point light source and said optical incident plane at a time of interchanging said light source unit is larger than a second distance between said light emitting surface of said point light source and said optical incident plane at a time of settled in a home position of said light source unit within said module case.

2. The backlight module according to claim 1, wherein one part of said coupling member is fixed to said light guide plate and another part of said coupling member comprises a member of said rear cover member of said module case, and said one part of said coupling member including said cover member is provided with said first protruded portion protruding in a direction facing said rear cover member of said module case provided with said second protruded portion thereon and said first protruded portion of said cover member is arranged so as to push said rear side member combined with said another part of said coupling member while said second protruded portion of said another part of said coupling member is arranged so as to push said cover member combined with said one part of the coupling member when said light source unit is settled at said home position, and wherein said light emitting surface of said point light source and said optical incident plane of said light guide plate are held by a distance specified by a spacer arranged between said light source unit and said light guide plate.

3. The backlight module according to claim 2, wherein said first protruded portion of said cover member is formed on an edge in an ejecting direction of said light source unit, and said protruded portion of said coupling member is formed on an edge in an inserting direction of said light source unit, and said light source unit is released from said home position by separating said first protruded portion of said cover member away from said coupling member while separating said protruded portion of said coupling member away from said cover member during interchanging said light source unit.

4. The backlight module according to claim 2, wherein said first protruded portion of said cover member and said protruded portion of said coupling member are arranged in the position opposing each other at said home position of said light source unit, and said light source unit is released from said home position by displacing said first protruded portion of said cover member and said protruded portion of said coupling member during interchanging said light source unit.

5. The backlight module according to claim 2, wherein at least one of said first protruded portion of said cover member and said protruded portion of said coupling member includes a leaf spring structure.

6. The backlight module according to claim 2, wherein at least one of said first protruded portion of said cover member and said protruded portion of said coupling member includes a leaf spring structure provided with a protruded point.

7. The backlight module according to claim 1, further comprising a thermal conductivity member between said cover member and said coupling member, and wherein a position of said coupling member is fixed to said light guide plate, and by pushing said cover member with said coupling member via said thermal conductivity member at a time of said home position of said light source unit, said light emitting surface of said point light source and said optical incident plane of said light guide plate are held in an interval specified by a spacer arranged between said light source unit and said light guide plate and heat which occurs by said point light source is conducted to said coupling member.

8. The backlight module according to claim 2, wherein said front side member of said cover member is provided with an inclined portion which is gradually separated from said light guide plate along an ejecting direction of said light source unit, and said inclined portion of said cover member touches a guide member provided on said frame of said coupling member at a time of ejecting said light source unit, and a distance between said light source unit and said optical incident plane is increased by shifting said cover member outside of said side wall member.

9. The backlight module according to claim 2, wherein said rear side member of said cover member is provided with an inclined portion which is gradually separated from said light guide plate along an ejecting direction of said light source unit, and said inclined portion of said cover member touches a guide member provided on a rear cover member of said coupling member at a time of ejecting said light source unit, and a distance between said light source unit and said optical incident plane of said light guide plate is increased by shifting said cover member outside of said side wall member.

10. The backlight module according to claim 1, wherein said cover member is provided with a notch portion extending in an ejecting direction of said light source unit at an end portion of an inserting and ejecting direction of said cover member such that said notch portion has an inclining portion so as to approach toward said light incident plane of said light guide plate, and a distance between said light source unit and said optical incident plane is increased by shifting a protruded portion formed on said light guide plate along said notch portion of said cover member at a time of ejecting said light source unit.

11. The backlight module according to claim 1, wherein said cover member is provided with said first protruded portion at an end portion of inserting and ejecting direction of said cover member, and said light guide plate is provided with a groove portion extending in said ejecting direction of said light source unit and having an inclining portion so as to approach toward said light incident plane of said light guide plate, and a distance between said light source unit and said optical incident plane is increased by shifting said first protruded portion of said cover member along said groove portion of said light guide plate at a time of ejecting of said light source unit.

12. A liquid crystal display device with a backlight module, said liquid crystal display device comprising:

a liquid crystal display panel housed in a module case;

a light guide plate housed in said module case so as to be located behind said liquid crystal display panel, said light guide plate having an elongated edge portion for a light incident surface between a pair of principal surfaces thereof;

a light source unit incorporated in said module case interchangeably so as to slide along a lengthwise direction of said edge portion of said light guide plate, said light source unit comprising a cover member provided with a first protruded portion, said cover member being for holding a plurality of point light sources along said lengthwise direction, a side member of said module case comprising a front side member and a rear side member provided with a second protruded portion and arranged in parallel to said principal surfaces of said light guide plate, and being united together with a side wall member; and a coupling member enabling to change a positional relationship between said light guide plate and said light source unit, said coupling member having such a structure that a first distance between a light emitting surface of said point light source and said optical incident plane at a time of interchanging said light source unit is larger than a second distance between said light emitting surface of said point light source and said optical incident plane at a time of settled in a home position of said light source unit within said module case.

13. A backlight module, comprising:

a light guide plate housed in a module case, said light guide plate comprising an elongated edge portion for a light incident surface between a pair of principal surfaces thereof; and a light source unit incorporated in said module case interchangeably so as to slide along a lengthwise direction of said edge portion of said light guide plate, said light source unit comprising a cover member provided with a first protruded portion, said cover member being for holding a plurality of point light sources along said lengthwise direction, a side member of said module case comprising a front side member and a rear side member provided with a second protruded portion, the rear side member being arranged in parallel to said principal surfaces of said light guide plate, and being united together with a side wall member,
wherein a point light source of said plurality of point light sources is fitted at a home position, and the first protruded portion is pushing the rear side member while the first protruded portion is pushing the cover member, thereby closely arranging the light emitting surface of the point light source and the optical incident plane of the light guide plate.

* * * * *